US006408149B1

United States Patent
Taira et al.

(12)

(10) Patent No.: US 6,408,149 B1
(45) Date of Patent: Jun. 18, 2002

(54) IMAGE PROCESSING APPARATUS, IMAGE READING APPARATUS, IMAGE FORMATION APPARATUS, CONTROL METHOD THEREOF, AND STORAGE MEDIUM

(75) Inventors: Masayoshi Taira, Kashiwa; Hiroaki Takeda, Kawasaki; Takeharu Uchizono, Moriya-machi; Hideaki Chishima, Hino; Satoru Kanno, Kashiwa; Masahiro Kurahashi, Tokyo; Satoru Kijima, Kashiwa, all of (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/589,160

(22) Filed: Jun. 8, 2000

(30) Foreign Application Priority Data

Jun. 8, 1999 (JP) .............................. 11-160737
Jun. 15, 1999 (JP) .............................. 11-168297
Oct. 27, 1999 (JP) .............................. 11-305688

(51) Int. Cl.$^7$ ............................................ G03G 15/00
(52) U.S. Cl. .................................................... 399/88
(58) Field of Search ........................... 399/37, 38, 51, 399/88, 90

(56) References Cited

U.S. PATENT DOCUMENTS

| 4,113,375 | A | * | 9/1978 | Murata et al. ............... 399/88 |
| 4,372,675 | A | * | 2/1983 | Sahay ........................ 399/88 |
| 5,317,366 | A | * | 5/1994 | Koshi et al. ............. 399/37 X |
| 5,455,657 | A | * | 10/1995 | Takeda ..................... 399/37 |

* cited by examiner

*Primary Examiner*—Sandra Brase
(74) *Attorney, Agent, or Firm*—Fitzpatrick, Cella, Harper & Scinto

(57) ABSTRACT

An image processing apparatus structured by combining an image reading apparatus and an image formation apparatus with each other enables a user to freely combine these apparatuses without considering the sum of power consumption of the image reading apparatus and power consumption of the image formation apparatus. When the sum of power consumption of a reader unit and power consumption of a printer unit exceeds, e.g., 1.5 kW, the reader unit is set to be in a low power consumption mode such that the sum of power consumption becomes equal to or smaller than 1.5 kW. Even when the low power consumption mode of the least power consumption quantity is selected and the sum of power consumption still exceeds 1.5 kW, use of the apparatus is inhibited and the inhibition is displayed.

86 Claims, 16 Drawing Sheets

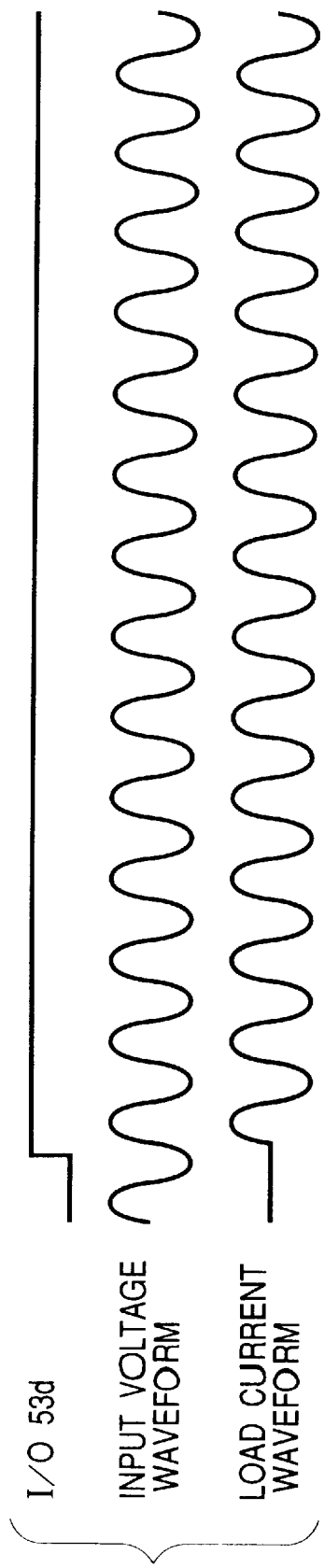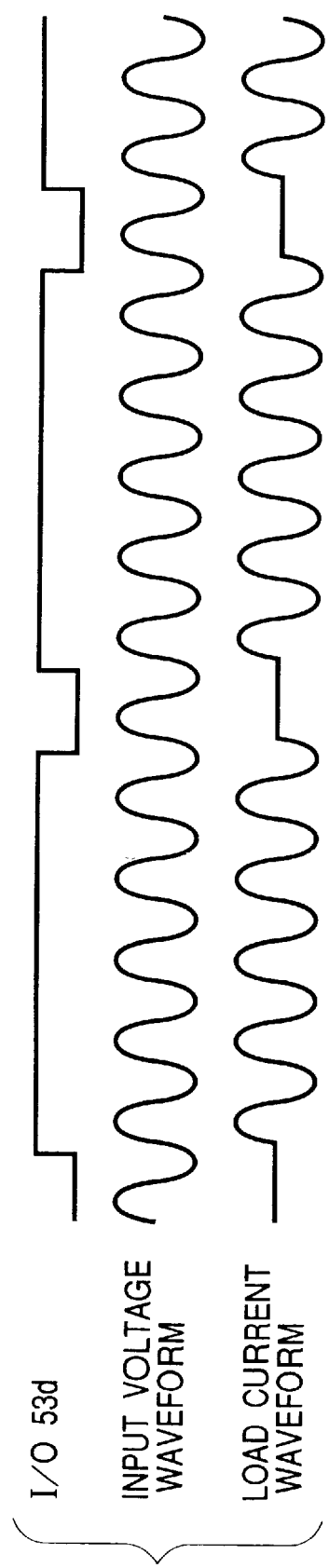

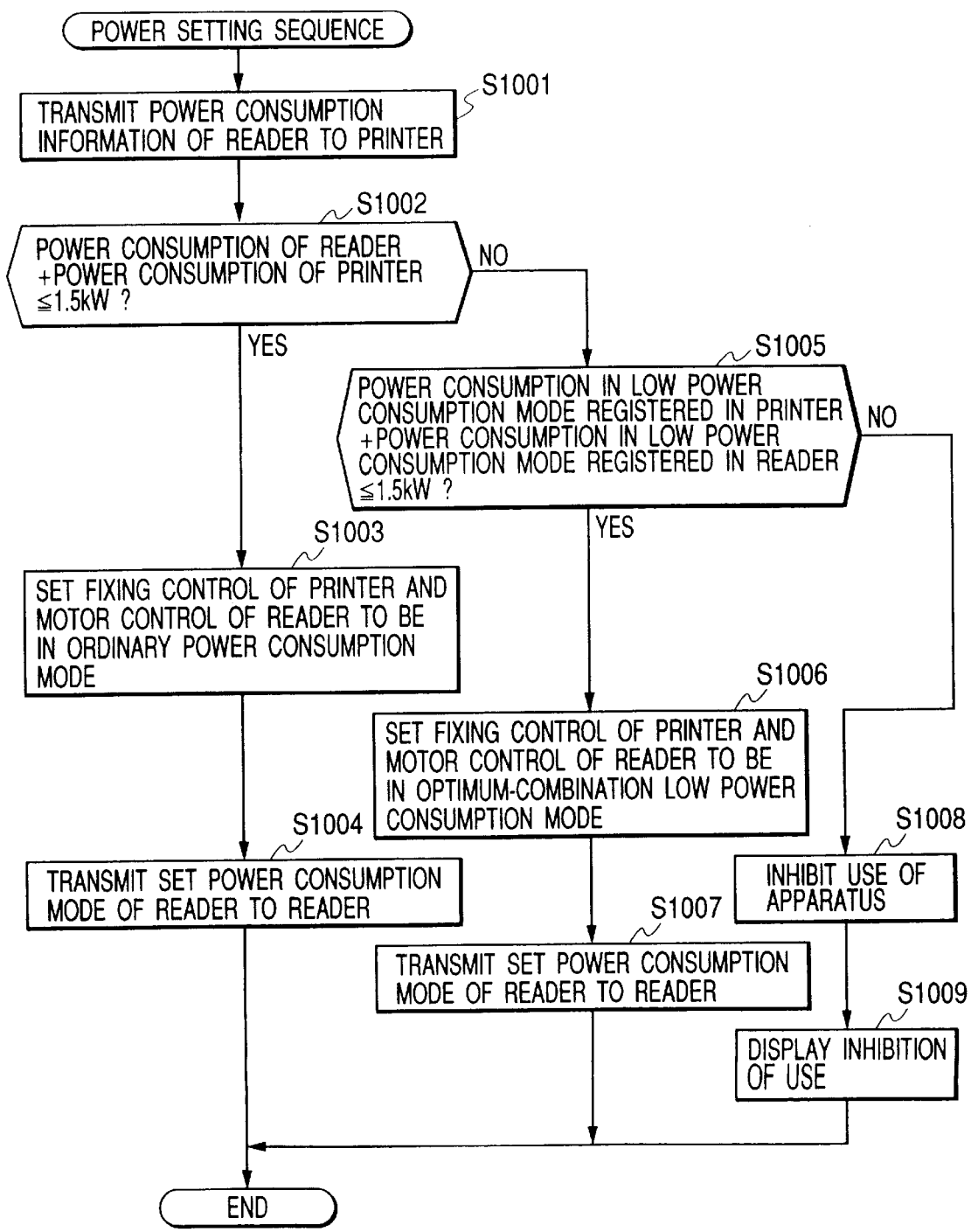

IMAGE PROCESSING APPARATUS, IMAGE READING APPARATUS, IMAGE FORMATION APPARATUS, CONTROL METHOD THEREOF, AND STORAGE MEDIUM

BACKGROUND OF THE INVENTION

1. Field of the Invention

The present invention relates to an image processing apparatus which is structured by combining an image reading apparatus and an image formation apparatus with each other, a control method for the image processing apparatus, and a storage medium

2. Related Background Art

By recent development of a digital copying machine, an image reading unit (a reader unit) and an image formation unit (a printer unit) can be separated from each other, thereby improving benefit and convenience.

By structuring as above, it is possible to enrich kinds of image reading apparatus and kinds of image formation apparatus respectively. Thus, by arbitrarily selecting either one of the plural kinds of image reading apparatus and either one of the plural kinds of image formation apparatus and combining the selected image reading apparatus with the selected image formation apparatus, it is possible to enrich a products lineup of the image processing apparatus.

However, in such the conventional image processing apparatus, the upper limit of total electric energy of the entire apparatus is predetermined. Thus, when the image reading apparatus and the image formation apparatus are arbitrarily combined with each other, the total power consumption value of both the image reading apparatus and the image formation apparatus sometimes exceeds the upper limit of the total electric energy of the entire image processing apparatus. In this case, there is some fear that breakdown and malfunction occur.

Further, in such the conventional image processing apparatus, a current (power) is ordinarily supplied to the image reading apparatus from a power supply unit provided in the image formation apparatus. Since current consumption of the image reading apparatus is different according to the kind of image reading apparatus, the limit value of the current to be supplied from the power supply unit to the image reading apparatus has been set according to the image reading apparatus of which current consumption is maximum. Thus, when the image reading apparatus of which current consumption is small is combined with the image formation apparatus, there is some fear that the supply of the current (power) is not shut down even if the current (power) exceeding a rating current of this image reading apparatus is supplied.

Further, in such the conventional image processing apparatus, the power supply unit provided in each image formation apparatus merely outputs a predetermined voltage value (i.e., a fixed value). Thus, when the image formation apparatus to be used is determined, selectable image reading apparatuses are necessarily determined. Namely, only the image formation apparatuses capable of operating with the predetermined voltage value output by the power supply unit provided in the determined image formation apparatus are selectable. Thus, the combination of the image reading apparatus and the image formation apparatus is limited.

Conversely, when a current (power) is supplied to the image formation apparatus from a power supply unit provided in the image reading apparatus, a similar problem occurs.

SUMMARY OF THE INVENTION

The present invention was made in consideration of the above-described conventional problems.

An object of the present invention is to provide an image processing apparatus which is structured by combining an image reading apparatus and an image formation apparatus with each other, a control method for the image processing apparatus, and a storage medium. In this image processing apparatus, a user can freely combine the image reading apparatus and the image formation apparatus with each other without considering the sum of power consumption of the image reading apparatus and power consumption of the image formation apparatus.

In order to achieve the above object, there is provided an image processing apparatus comprising:

image reading means for reading an image;

image formation means for forming the image read by the image reading means;

supply means for supplying power to the image formation means and the image reading means; and setting means for setting a control condition of the image processing apparatus according to power consumption of the image reading means and power consumption of the image formation means.

Further, there is provided a control method for an image processing apparatus which comprises an image reading unit for reading an image, an image formation unit for forming the image read by the image reading unit, and a supply unit for supplying power to the image formation unit and the image reading unit, the method comprising:

a setting step of setting a control condition of the image processing apparatus according to power consumption of the image reading unit and power consumption of the image formation unit.

Further, there is provided a computer-readable storage medium which stores a computer program to control an image processing apparatus which comprises an image reading unit for reading an image, an image formation unit for forming the image read by the image reading unit, and a supply unit for supplying power to the image formation unit and the image reading unit, the computer program including:

a setting step of setting a control condition of the image processing apparatus according to power consumption of the image reading unit and power consumption of the image formation unit.

Other objects and features of the present invention will become apparent from the following detailed description and the attached drawings.

BRIEF DESCRIPTION OF THE DRAWINGS

FIGS. 19A and 19B are diagrams showing waveforms of input current and load voltage of a heater in the embodiment of the present invention; and FIG. 20 is a flow chart showing a processing procedure of a power setting sequence according to the seventh embodiment of the present invention.

DETAILED DESCRIPTION OF PREFERRED EMBODIMENTS

Hereinafter, the embodiments of the present invention will be explained in detail with reference to the attached drawings.

(First Embodiment)

Figure 1:
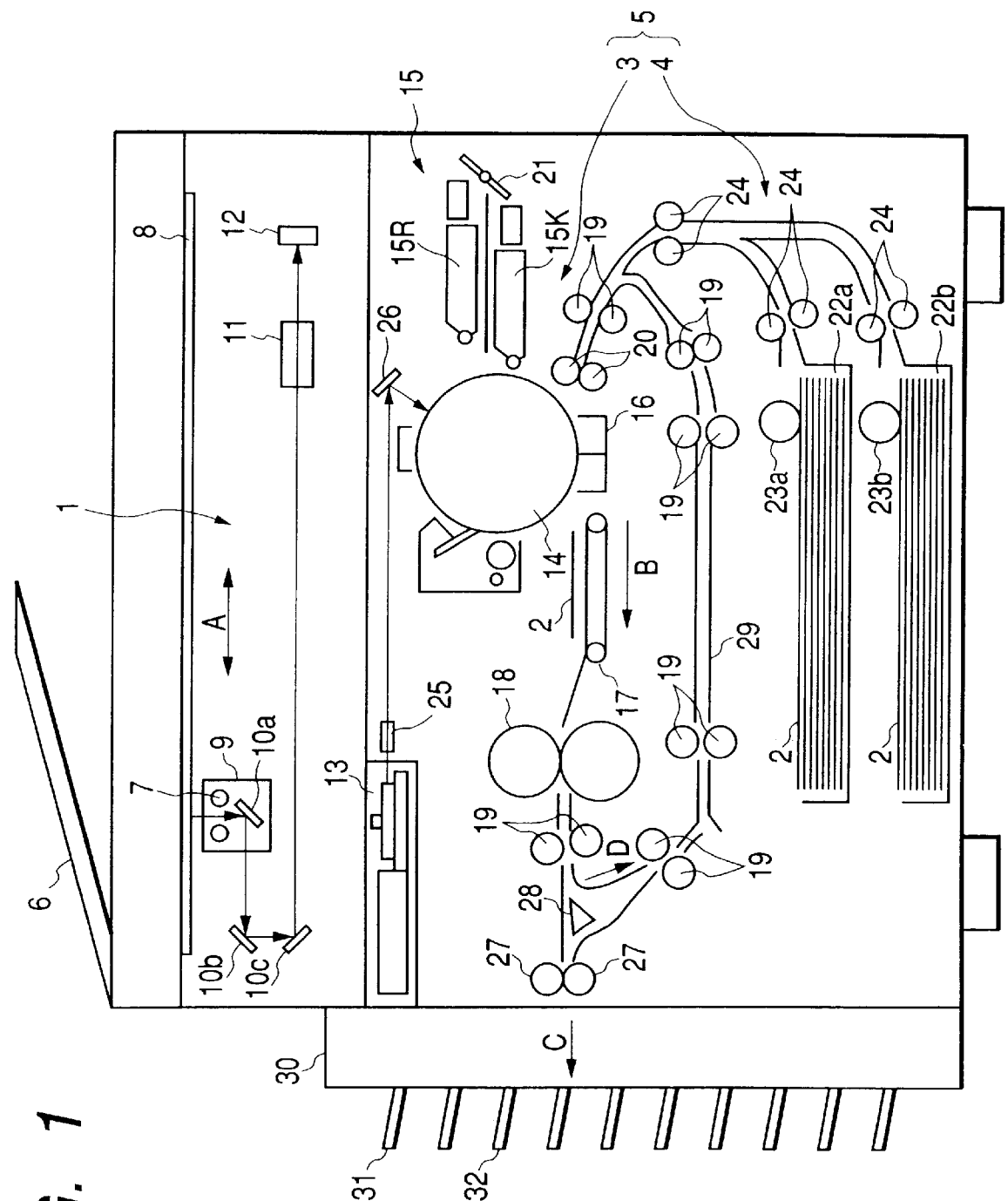
FIG. 1 is a sectional view showing an internal structure of an image processing apparatus according to the first embodiment of the present invention.

FIG. 1 is a sectional view showing an internal structure of an image processing apparatus according to the first embodiment of the present invention. This image processing apparatus is composed of an image information reading unit (referred as a reader unit hereinafter) 1 which reads image information represented on an original, an image formation system 3 which forms an image on a recording sheet 2 based on the image information read by the reader unit 1, and a sheet feeding/carrying unit 4 which supplies and feds the recording sheet 2 to the image formation system 3. In the embodiment, the image formation system 3 and the sheet feeding/carrying unit 4 together constitute a copying unit (an image information writing unit; referred as a printer unit hereinafter) 5.

Concretely, the reader unit 1 is composed of an original feed unit 6 on which appropriate number of originals are stacked, a not-shown original carrying mechanism, a scanner unit 9 which moves along a direction indicated by an arrow A to irradiate by using an exposure lamp 7 the original stacked on an original mounting board glass 8, plural reflection mirrors 10a, 10b and 10c, a condenser lens 11, and a CCD (charge-coupled device) image sensor 12 to which the image information represented on the original is input.

The image formation system 3 is composed of an exposure control unit 13 which converts the image information (an electrical signal) input to the CCD image sensor 12 into a light signal, a photosensitive body 14 on which the light signal from the exposure control unit 13 is irradiated, a development unit 15 which develops a latent image formed on the photosensitive body 14 in a desired color, a transfer unit 16 which transfers the image information on the recording sheet 2, a carrying conveyer 17, a fixing unit which mainly includes a pair of upper and lower drums 18, plural sets of carrying rollers each of which includes a pair of rollers (simply referred as carrying rollers hereinafter) 19, and a pair of registration rollers (simply referred as a registration roller) 20.

The sheet feeding/carrying unit 4 is composed of sheet feed cassettes 22a and 22b which respectively contain the recording sheets 2, recording sheet overbearers 23a and 23b, and plural sets of carrying rollers (simply referred as carrying rollers) 24.

In the image processing apparatus structured as above, the originals stacked on the original feed unit 6 are sequentially carried one by one to the original mounting board glass 8. When the original is carried to the original mounting board glass 8, the exposure lamp 7 is turned on, and the scanner unit 9 is moved along the direction indicated by the arrow A, thereby irradiating the original. Then a reflection light from the original passes the condenser lens 11 through the reflection mirrors 10a to 10c, and the light from the condenser lens 11 is input to the CCD image sensor 12. Next, the image information input to the CCD image sensor 12 is subjected to predetermined processing by a later-described image processing unit, input to the exposure control unit 13, and converted into the light signal. Next, the image information converted into the light signal by the exposure control unit 13 is irradiated to the photosensitive body 14 through a lens 25 and a reflection mirror 26. The latent image formed on the photosensitive body 14 by this irradiation light is developed by the development unit 15 including predetermined development components.

On the other hand, the recording sheet 2 is carried from the sheet feed cassette 22a or 22b to the transfer unit 16 through the carrying rollers 24, in synchronism with the latent image on the photosensitive body 14. Then the developed image is transferred to the recording sheet 2, the recording sheet 2 is carried to the fixing unit 18 along a direction indicated by an arrow B on the carrying conveyer 17, and the transferred image is fixed to the recording sheet 2 by the fixing unit 18.

In case of monochrome copying, the recording sheet 2 is discharged to a sorter 30 along a direction indicated by an arrow C through a pair of sheet discharge rollers (simply referred as a discharge roller) 27. On the other hand, in case of multicolor copying, the recording sheet 2 is carried along a direction indicated by an arrow D through a bifurcation mechanism 28. After passing a lower carrying path 29, the recording sheet 2 once stops at the registration roller 20. Then the development component of the development unit 15 is changed to the predetermined one, development is performed by the predetermined development component changed, the recording sheet is again carried to the transfer unit 16 to transfer the developed image to the recording sheet 2, and the transferred image is fixed to the sheet 2 by the fixing unit 18, thereby performing predetermined multicolor copying. After then, the recording sheet 2 is discharged to the sorter 30 along the direction C through the discharge roller 27.

When a sorting function is on in the sorter 30, the discharged recording sheets 2 are sorted into respective bins 32. When the sorting function is off, the discharged recording sheets 2 are discharged to an uppermost bin 31.

The development unit 15 includes a black development component 15K containing a black toner and a red development component 15R containing a red toner. In order to be able to perform the development by using these toners, either one of the development components 15K and 15R is disposed in the vicinity of the photosensitive body 14 by means of a development component change unit 21. At this time, the other development component is escaped from the photosensitive body 14. Further, either one of the drums in the fixing unit 18 contains a not-shown heater, whereby the image is fixed to the recording sheet 2 by this heater.

Next, a method of recording the sequentially read image information on the both (i.e., front and back) faces of one recording sheet will be explained.

After the recording sheet 2 to which the image was fixed by the fixing unit 18 is once carried up to the sheet discharge roller 27, the carrying direction is reversed to carry the sheet 2 in the direction D through the bifurcation mechanism 28. Thus the recording sheet 2 once stops at the registration roller 20 after passing the lower carrying path 29. When a next original is prepared, an original image thereof is read in the same manner as above. At this time, since the recording sheet 2 is fed from the lower carrying path 29, resultingly the two original images can be recorded respectively on the front and back faces of one sheet.

Figure 2:
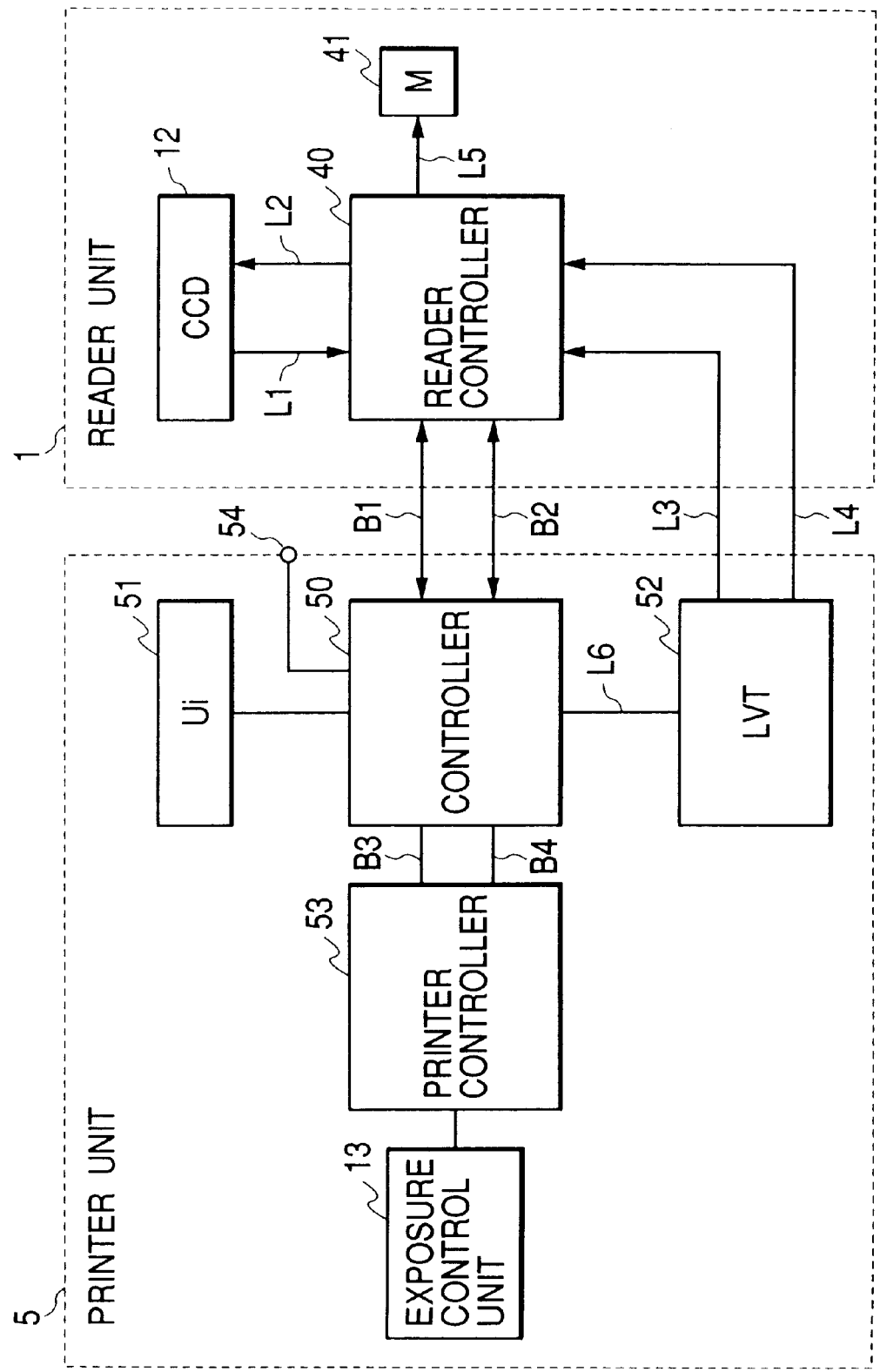
FIG. 2 is a block diagram showing a structure of control components of the image processing apparatus of FIG. 1.

FIG. 2 is a block diagram showing a structure of control components of the image processing apparatus according to the present embodiment. In FIG. 2, the components same as those shown in FIG. 1 are represented by the same reference numerals respectively.

In FIG. 2, image data which was photoelectrically converted by the CCD 12 and appropriately analog-amplified and A/D (analog-to-digital) converted is transferred to a reader controller 40 through a line L1. The reader controller 40 performs shading correction to the received image data, and then transfers the corrected data to a controller 50 through an image transfer bus B1.

Various timing pulses which are generated by the reader controller 40 and used to drive the CCD 12 are transferred to the CCD 12 through a line L2.

Further, a stepping motor 41 which is connected to the reader controller 40 is forwardly and reversely rotated under the control of the reader controller 40. Thus, as described above, the scanner unit 9 is reciprocated to scan the original put on the original mounting board glass 8.

The controller 50 which is the unit to control the printer unit 5 and the reader unit 1 overall transmits/receives various control data to/from the reader controller 40 through a data bus B2.

A Ui (user interface unit) 51 which includes a display unit composed of keys, an LCD (liquid crystal display) and the like transmits key input information to the controller, receives display data output from the controller 50, and performs display according to the received display data.

An LVT (low-voltage power supply unit) 52 generates low-voltage power from an AC voltage supplied by a not-shown commercial power supply, on the basis of an instruction of the controller 50. As the low-voltage power, control power (e.g., 3.3V) to be supplied to a control unit such as a CPU or the like and driving power (e.g., 24V) to drive a motor, a solenoid and the like are generated.

The control power is supplied to the reader controller 40 through a power supply line L3 and also supplied to necessary units in the printer unit 5. The driving power is supplied to the reader controller 40 through a power supply line L4 and also supplied to necessary units in the printer unit 5.

The image data received from the reader controller 40 is subjected to image processing such as magnification change, edge emphasis, binarization and the like by the controller 50. Then the processed image data is transferred to a printer controller 53 through an image data bus B3.

The printer controller 53 which is the unit to control a sheet feed system of the printer unit 5 and an electrification system necessary to image formation transmits/receives various control data to/from the controller 50 through a data bus B4. Further, the printer controller 53 adds various timing signals necessary for the printing to the image data received through the image data bus B3 and then outputs the obtained image data to the image data bus B3.

The exposure control unit 13 generates a laser beam (not shown) with a predetermined light quantity according to the image data received through the image data bus B3 and the timing signal, and irradiates the generated laser beam to the photosensitive body 14 to form the latent image thereon.

An external interface 54 which is connected to the controller 50 communicates with an apparatus (e.g., a not-shown personal computer) other than the image processing apparatus of the present embodiment.

Figure 3:
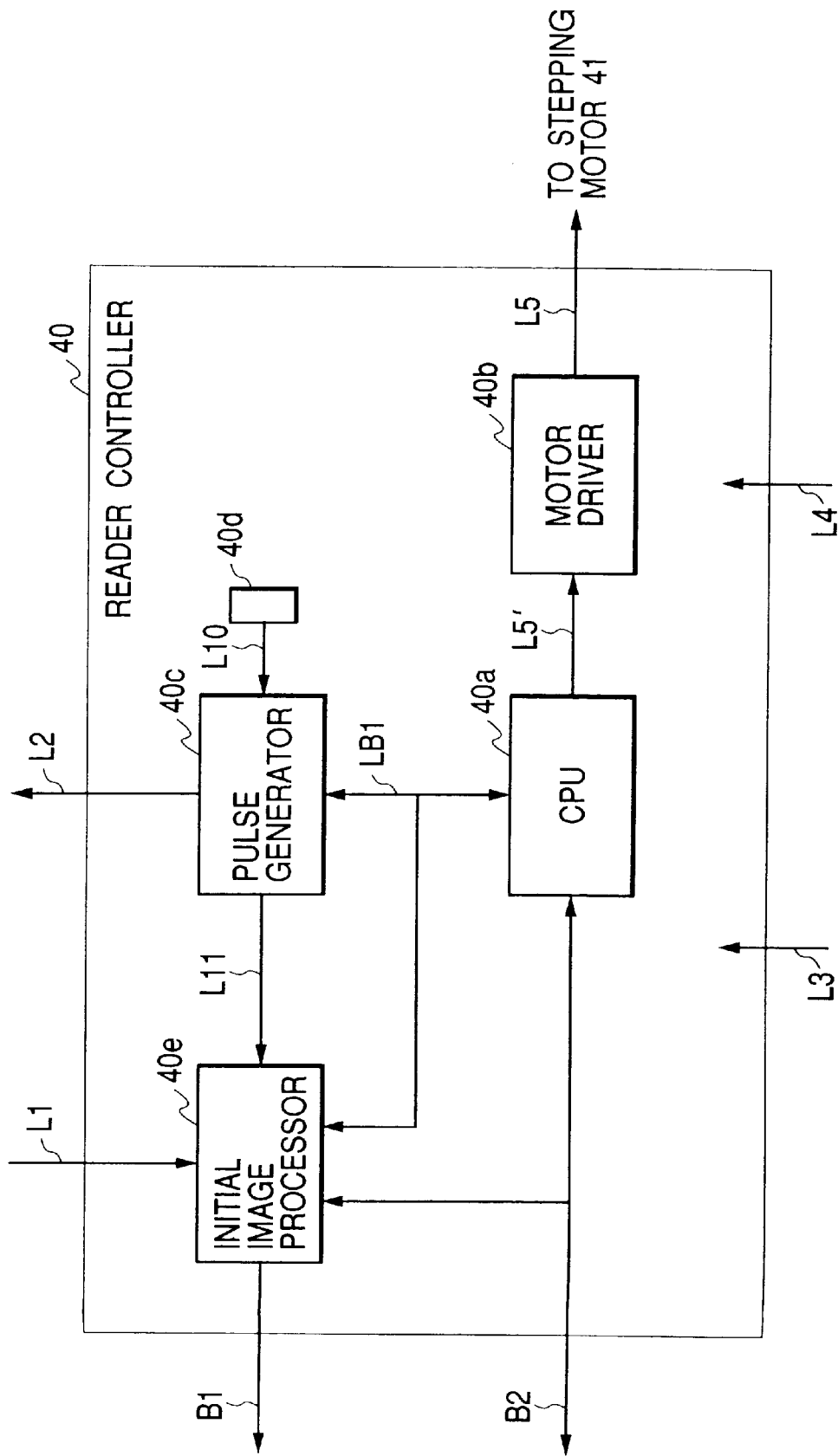
FIG. 3 is a block diagram showing a detailed structure of a reader controller of FIG. 2.

FIG. 3 is a block diagram showing a detailed structure of the reader controller 40. In FIG. 3, the components same as those shown in FIG. 2 are represented by the same reference numerals and symbols respectively.

A CPU 40a is the one-chip CPU which contains not-shown ROM and RAM. The CPU 40a controls an operation of the reader unit 1, performs setting to a pulse generator 40c and an initial image processor 40e through a local data bus LB1, and generating operation timing. Further, the CPU 40a transmits/receives information to/from the controller 50 through the data bus B2.

Further, the CPU 40a transfers a motor control signal to a motor driver 40b through a line L5' to control the stepping motor 41.

The motor driver 40b drives the stepping motor 41 through a motor driving line L5, according to a motor clock signal representing rotation speed of the stepping motor 41, a rotation direction signal and a driving enable signal. The motor clock signal, the rotation direction signal and the driving enable signal are included in the motor control signal. The driving power supplied through the power supply line L4 is used as driving power for the stepping motor 41.

The pulse generator 40c receives a clock from an oscillator 40d through a line L10, generates a CCD timing signal according to setting of the CPU 40a, and drives the CCD 12 through the line L2. At the same time, the pulse generator 40c generates an image clock in synchronism with the image data transferred from the CCD 12 through the line L1, and transfers the generated image clock to the initial image processor 40e through a line L11. The image clock can be selectively changed by the CPU 40a in a state that the speed of the image clock keeps correlation to the CCD timing signal.

The initial image processor 40e performs shading processing to the image data transferred from the CCD 12, and then transfers the processed image data to the image transfer bus B1 in synchronism with the image clock. An information signal concerning the image data passed the data bus B2 is directly supplied to the initial image processor 40e, whereby critical timing signals concerning the image data are exchanged.

In the present embodiment, it is unnecessary for an operation clock of the CPU 40a to be in synchronism with an image clock generated by the pulse generator 40c. Thus it is possible to arbitrarily select these clocks including a case where the operation clock is in synchronism with the image clock.

Figure 4:
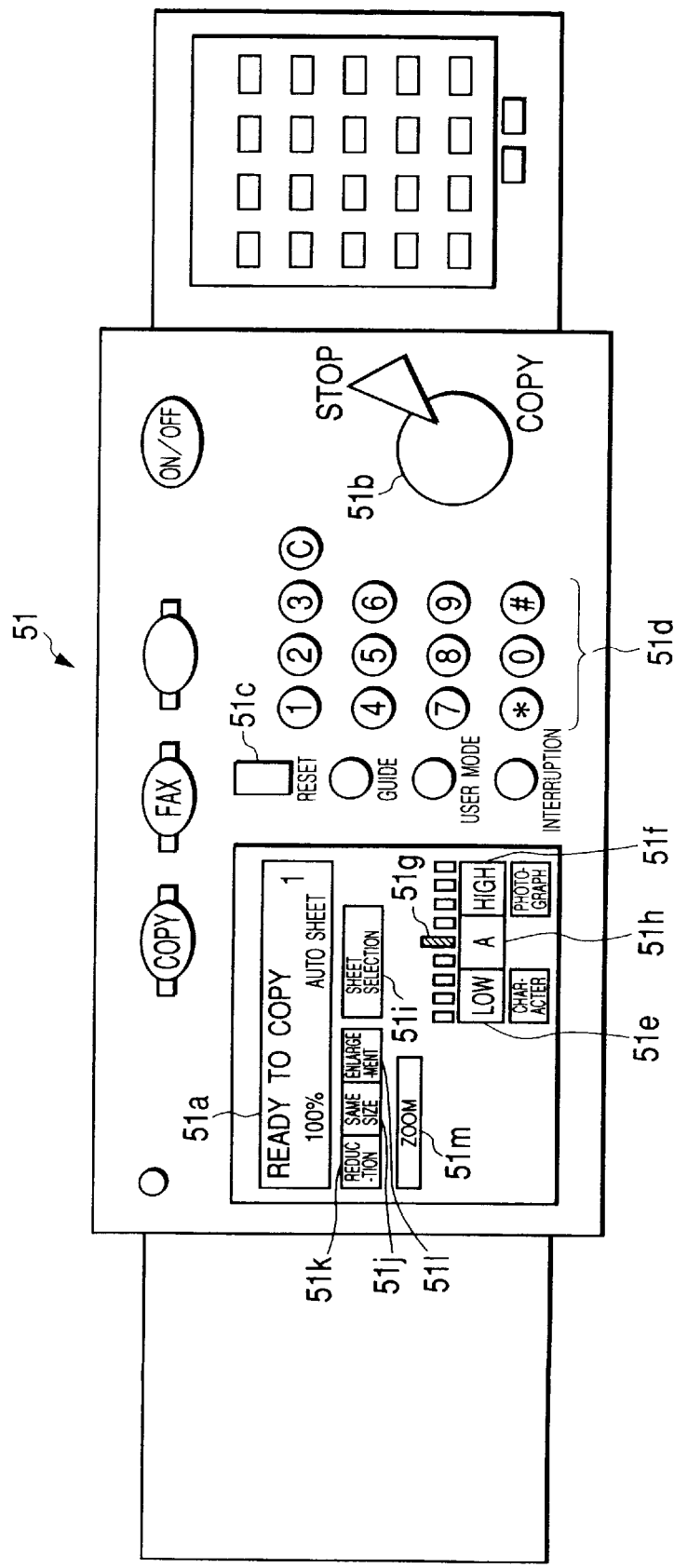
FIG. 4 is a plan view of a Ui (a user interface unit) of FIG. 2.

FIG. 4 is a plan view showing the Ui 51 of FIG. 2.

As shown in FIG. 4, the Ui 51 includes various keys and a dot-matrix display section (LCD) 51a.

The display section 51a which displays a state of the image processing apparatus, the number of copies, magnification, a sheet to be selected and various operation mode screens is operated by later-described various control keys.

A start key 51b is used to start a copying operation. A reset key 51c is used to return (or reset) a set mode to a standard state. A key group 51d is composed of ten keys "0" to "9" used to input the number of copies, the magnification and the like, a clear key "C" used to clear the input, and the like. Density adjustment keys 51e and 51f are used respectively to decrease and increase density. A state of the density adjusted by the density adjustment keys 51e and 51f is displayed at a bar-scale density display section 51g. Symbol 51h denotes a key to turn on/off an automatic density adjustment function and its display section. Symbol 51i denotes a key used to select a sheet feed stage and an automatic sheet selection mode. A selected state is displayed on the display section 51a. Symbols 51j, 51k and 51l denote keys used to set a finite reduction mode, a same size mode and a finite enlargement mode, respectively. Symbol 51m denotes a key used to set an automatic magnification change mode. A state set by the key 51m is displayed on the display section 51a.

Figure 5:
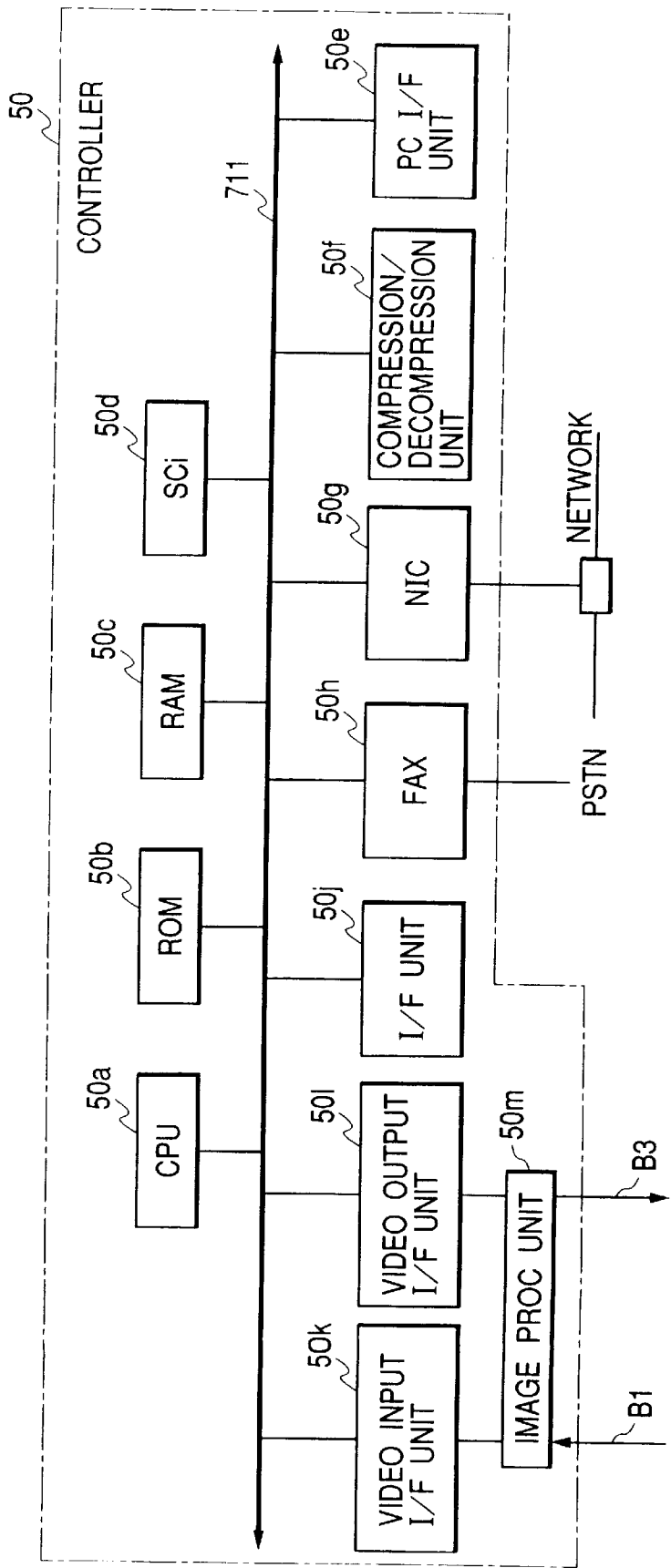
FIG. 5 is a block diagram showing a detailed structure of a controller of FIG. 2.

FIG. 5 is a block diagram showing a detailed structure of the controller 50 shown in FIG. 2.

In FIG. 5, a CPU 50a controls the controller 50 as a whole, on the basis of a program stored in a ROM 50b.

A RAM 50c is used as a working area of the CPU 50a and a storage area of the image information read by the reader unit 1.

An SCi (serial communication interface) 50d is used when the CPU 50a transmits/receives the information to/from the reader controller 40, the LVT 52 and the printer controller 53.

A PC I/F (personal computer interface) unit 50e is the interface such as a bi-directional Centronics. The PC I/F unit 50e is used when printing data is received from the personal computer, and when a state of the image processing apparatus is notified to the personal computer.

A compression/decompression unit 50f compresses and decompresses image data at high speed, and supports a format such as a JBIG (Joint Bi-level Image experts Group) format, an MMR (Modified Modified Read coding) format, and the like.

An NIC (network interface) 50g interfaces with a network based on a 10BASE standard or the like. The CPU 50a receives the printing data from the computer in the network and notifies the state of the image processing apparatus to the personal computer, through the NIC 50g.

A facsimile unit 50h which contains a modem and a line processing circuit transmits and receives the image data compressed in a predetermined format through a communication line (PSTN: Public Switched Telephone Network).

An interface unit 50j which contains an LCD controller interfaces with the Ui 51. The CPU 50a transmits display data to the Ui 51 and receives the key input data from the Ui 51, through the interface unit 50j.

An image processing unit 50m receives the image data from the reader unit 1 through the image transfer but B1, performs image processing (later described) to the received data, and then outputs the processed data to a video input I/F (interface) unit 50k.

The video input I/F unit 50k converts timing of the input image data, and stores the converted timing in the RAM 50c. On the other hand, the timing of the image data stored in the RAM 50c is converted by a video output I/F (interface) unit 50l, the timing-converted image data is subjected to the image processing (later described) by the image processing unit 50m, and then the processed image data is transferred to the printer controller 53 through the image transfer bus B3.

Figure 6:
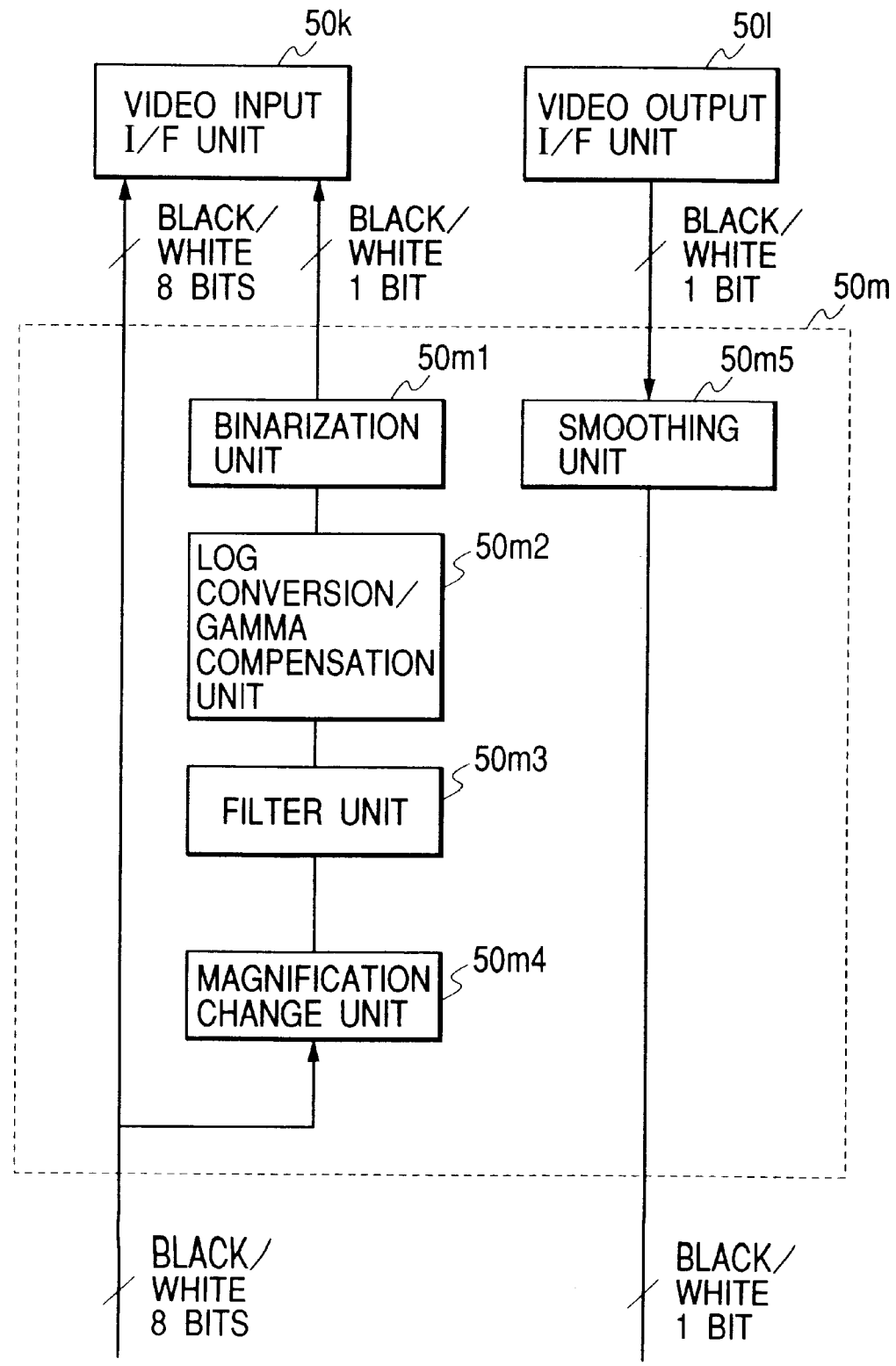
FIG. 6 is a block diagram showing a detailed structure of an image processing unit of FIG. 5.

FIG. 6 is a block diagram showing a detailed structure of the image processing unit 50m. There are two cases, in one case eight-bit image data is transferred to the video input I/F unit 50k as it is as shown in FIG. 6, and in the other case the image data is subjected to following image processing.

Namely, the image processing includes magnification change processing such as enlargement and reduction performed by a magnification change unit 50m4, filter processing performed by a filter unit 50m3, logarithmic conversion processing performed according to a characteristic of a printer or the like by a logarithmic conversion/gamma compensation unit 50m2, and binarization processing performed based on error dispersion algorithm or the like by a binarization unit 50m1. An information quantity of the image data is reduced by the above image processing.

Image data of 600 dpi output from the video output I/F unit 50l is pseudo-converted into data of 2400 dpi by a smoothing unit 50m5.

Figure 7:
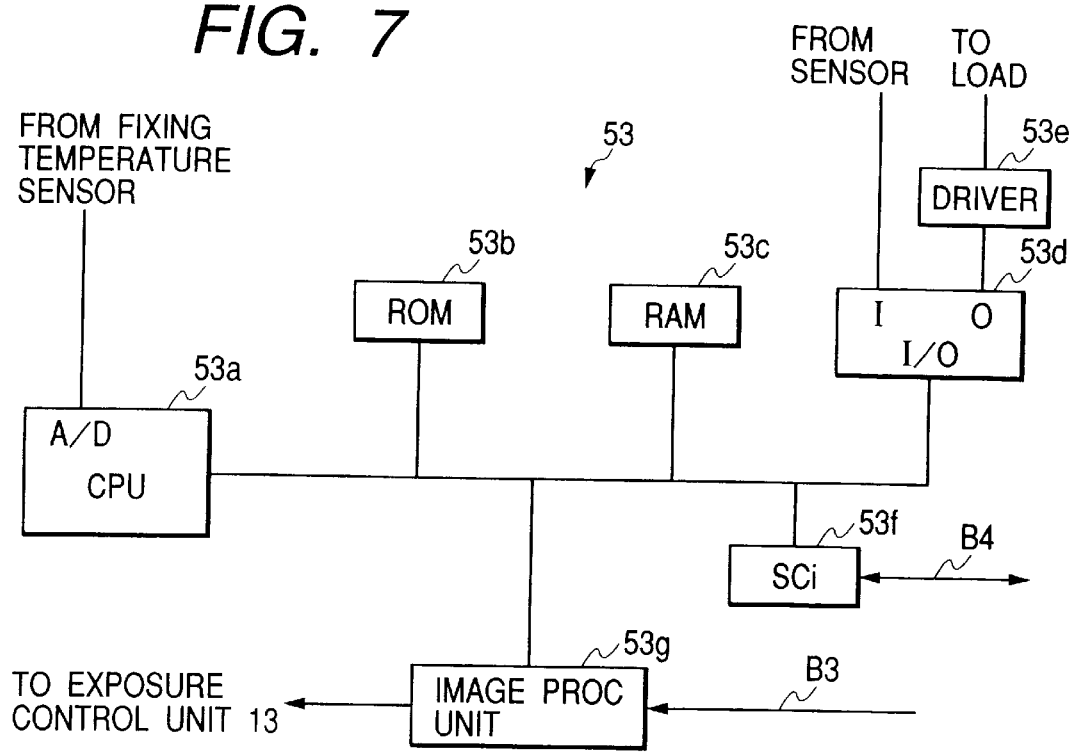
FIG. 7 is a block diagram showing a detailed structure of a printer controller of FIG. 2.

FIG. 7 is a block diagram showing a detailed structure of the printer controller 53 shown in FIG. 2.

In FIG. 7, a CPU 53a mechanically controls the printer unit 5 according to a program stored in a ROM 53b. A RAM 53c is used by the CPU 53a. Signals transferred from not-shown various sensors are read by the CPU 53a through an I/O (input/output port) 53d.

As the various sensors, for example, a sheet sensor for detecting presence/absence of a transfer sheet, and the like can be used. An output from an output port of the I/O 53d is supplied to a driver 53e, the supplied output is converted into a necessary drive voltage, and the obtained drive voltage is supplied to not-shown various loads. As the various loads, there are a fixing heater, a sheet feed motor, a sheet feed clutch, a sheet feed solenoid and the like.

An SCi (serial communication interface) 53f is used when the CPU 53a transmits/receives the information to/from the controller 50.

A not-shown temperature sensor for detecting temperature of the fixing unit 18 is connected to an A/D input of the CPU 53a. Thus the CPU 53a controls a fixing heater (not shown) according to the temperature detected by the temperature sensor.

An image processing unit 53g outputs the image data from the controller 50 to the exposure control unit 13 according to timing of a main scanning direction.

Figure 8:
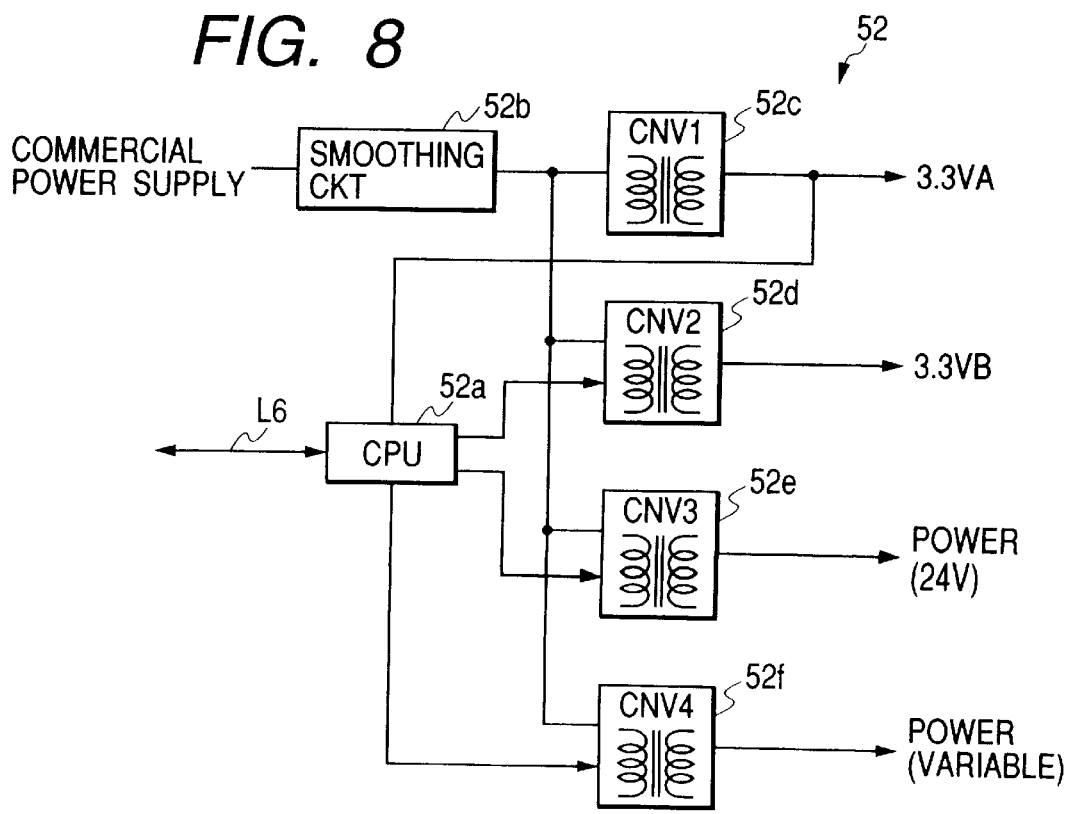
FIG. 8 is a block diagram showing a detailed structure of an LVT (a low-voltage power supply unit) of FIG. 2.

FIG. 8 is a block diagram showing a detailed structure of the LVT 52 shown in FIG. 2.

In FIG. 8, a CPU 52a which is the one-chip CPU containing not-shown ROM and RAM controls an operation of the LVT 52, and transmits/receives information to/from the controller 50 through a line L6.

Power from a commercial power supply is smoothed by a smoothing circuit 52b, and an output of the circuit 52b is connected to DC/DC converter units 52c, 52d, 52e and 52f.

The DC/DC converter unit (CNV1) 52c always operates to generate a power supply voltage 3.3 VA for control. This power supply voltage 3.3VA is supplied by the CPU 52a.

The DC/DC converter unit (CNV2) 52d generates a power supply voltage 3.3VB for control. This power supply voltage can be on/off controlled by the CPU 52a.

The DC/DC converter unit (CNV3) 52e generates driving power (24V). Also, this driving power can be on/off controlled by the CPU 52a.

The DC/DC converter unit (CNV4) 52f generates driving power (variable into two). This driving power can be on/off controlled by the CPU 52a, and further an output voltage can be set by the CPU 52a. In the DC/DC converter unit (CNV4) 52f, a not-shown current limiter circuit is further provided. Also, a limiter current value to operate this current limiter circuit can be set by the CPU 52a.

Control processing to be performed by such the image processing apparatus as structured above will be explained with reference to FIG. 9.

Figure 9:
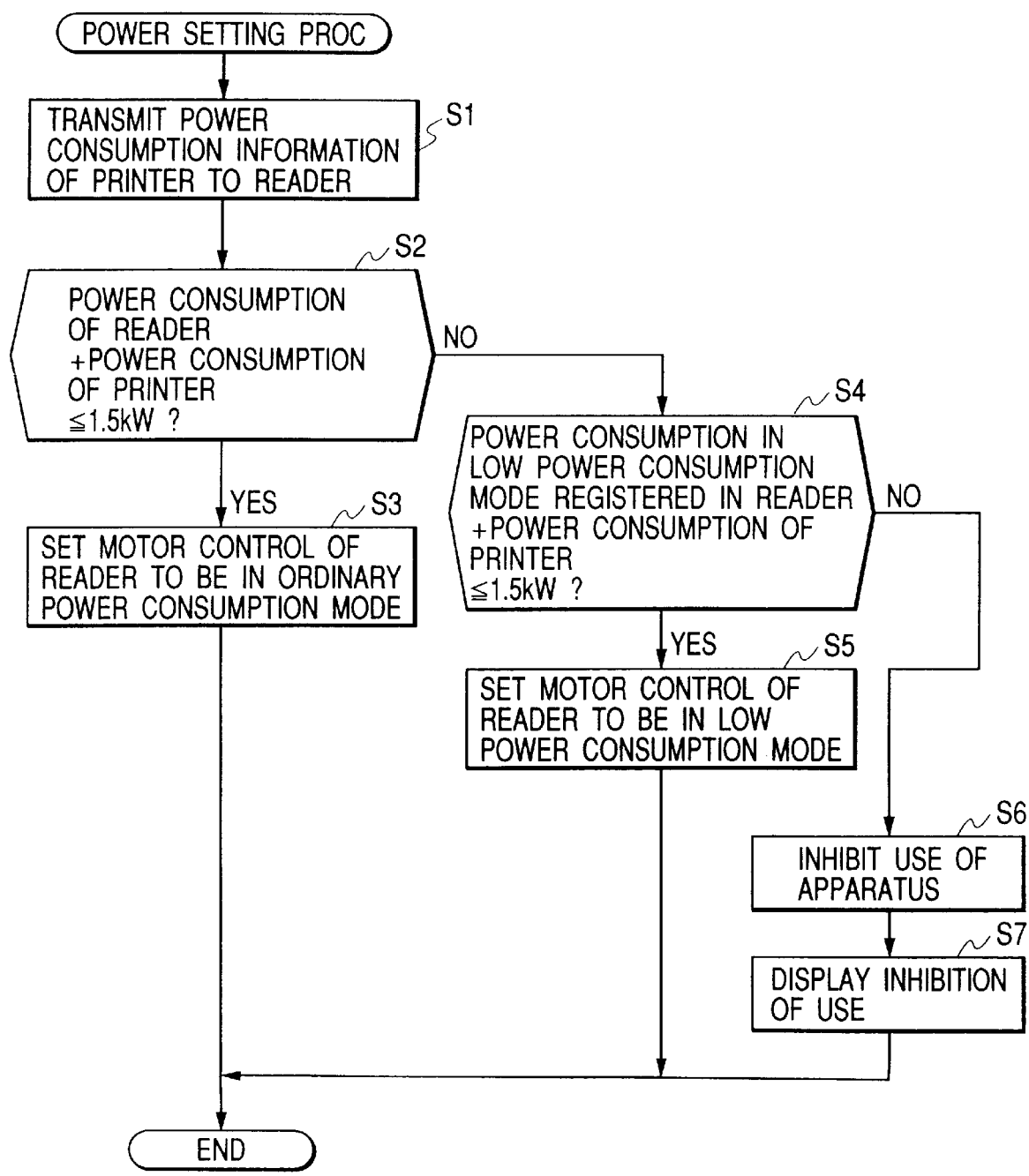
FIG. 9 is a flow chart showing a procedure of power setting processing to be performed by the image processing apparatus (especially a CPU of the controller and a CPU of the reader controller)

FIG. 9 is a flow chart showing a procedure of power setting processing to be performed by the image processing apparatus (especially the CPU 50a of the controller 50 and the CPU 40d of the reader controller 40).

In FIG. 9, after the power supply is turned on, the CPU 50a reads information concerning power consumption of the printer unit 5 from the ROM 50b and transfers the read information to the reader unit 1 (concretely the CPU 40a) (step S1).

Next, the CPU 40a judges whether or not the sum of the power consumption of the printer unit 5 derived from the received information and the power consumption (previously stored in, e.g., the ROM of the CPU 40a) of the reader unit 1 is equal to or smaller than a predetermined value (e.g., 1.5 kW) (step S2). When the sum is equal to or smaller than 1.5 kW, motor control of the reader unit 1 is set to be in an ordinary power consumption mode (step S3). Conversely, when the sum exceeds 1.5 kw, it is further judged whether or not there is a predetermined power value in power consumption corresponding to plural low power consumption modes set or registered in the reader unit 1 (step S4). At this time, it should be noted that this predetermined power value is the value which satisfies that the sum of this predetermined power value and the power consumption of the printer unit 5 is equal to or smaller than 1.5 kw.

When judged in the step S4 that there are the low power consumption modes each having the power value equal to or smaller than 1.5 kw, the power consumption mode of the reader unit 1 is set to be the highest-performance low power consumption mode thereamong (step S5). Conversely, when there is no low power consumption mode having the power value equal to or smaller than 1.5 kW, use of the image processing apparatus structured by combining these printer unit 5 and reader unit 1 is inhibited (step S6). Further, the display section 51a displays that the use of the apparatus is inhibited and the combination of the reader unit 1 and the printer unit 5 at that time is impossible (step S7).

As above, in the present embodiment, the power consumption of the reader unit 1 is changed according to the power consumption of the printer unit 5 connected to the reader unit 1. Thus, it is possible to remarkably increase the number of combinations of the connected printer unit 5 and reader unit 1 without breakdown and malfunction, whereby it is possible to provide the image processing apparatus having an enriched products lineup to a user.

(Second Embodiment)

Next, an image processing apparatus according to the second embodiment of the present invention will be explained.

Since the image processing apparatus of the present embodiment is different from the image processing apparatus of the first embodiment only in a method of control processing, the hardware same as that in the image processing apparatus of the first embodiment is used, whereby the explanation of the hardware will be omitted in the present embodiment.

Figure 10:
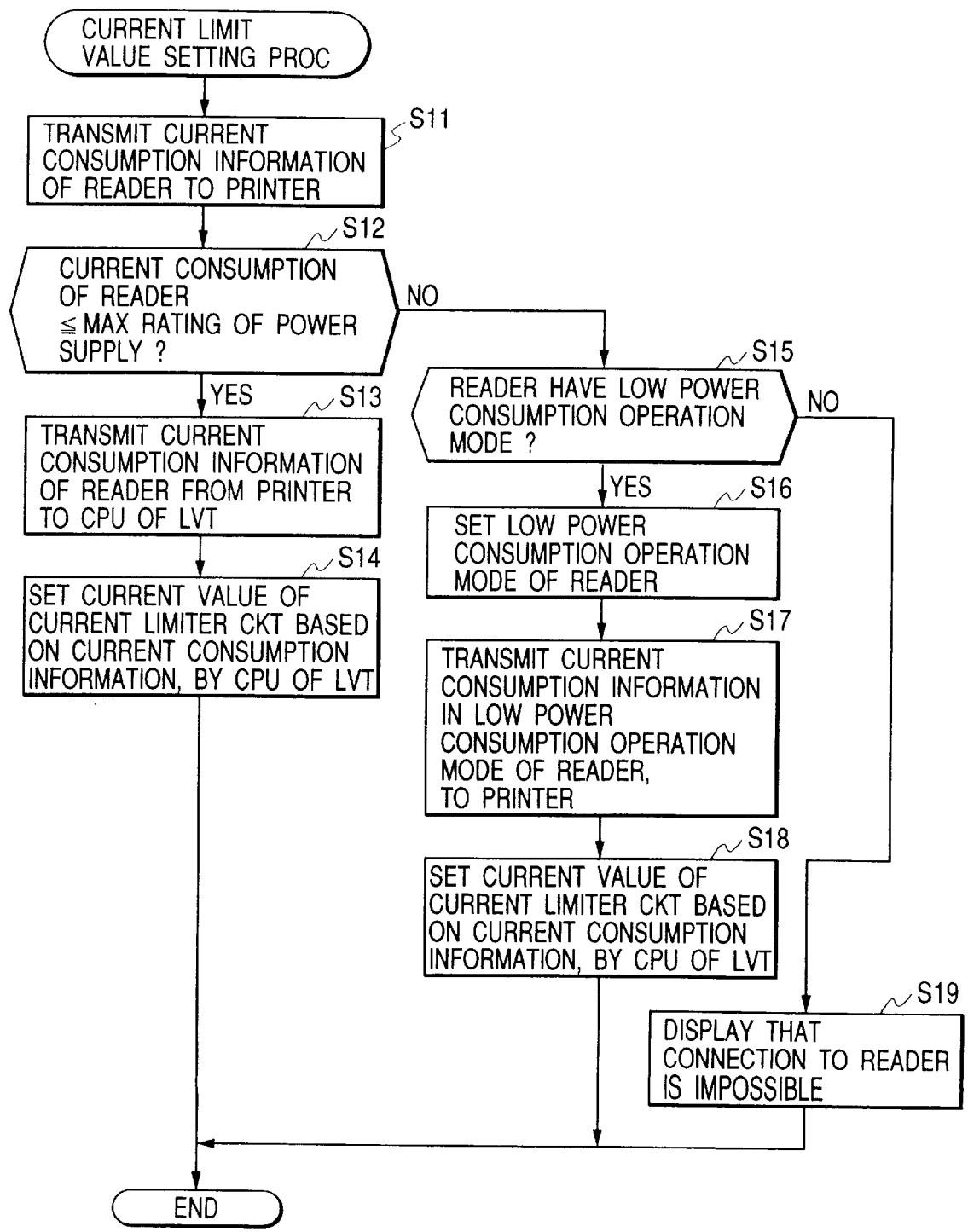
FIG. 10 is a flow chart showing a procedure of current limit value setting processing to be performed by an image processing apparatus (especially a CPU of a controller and a CPU of a reader controller) according to the second embodiment of the present invention.

FIG. 10 is a flow chart showing a procedure of current limit value (limit current value) setting processing to be performed by the image processing apparatus (especially a CPU 50a of a controller 50 and a CPU 40a of a reader controller 40) according to the present embodiment.

In FIG. 10, after a power supply is turned on, the CPU 40a reads information concerning current consumption of a reader unit 1 from a ROM of the CPU 40a and transfers the read information to a printer unit 5 (concretely the CPU 50a) (step S11).

Next, the CPU 50a judges whether or not the sum of the received current consumption of the reader unit 1 is equal to or smaller than a maximum rating of a power supply CNV4 (step S12). When the sum is equal to or smaller than the maximum rating, current consumption information of the reader unit 1 received is transferred to a CPU 52a of an LVT 52 (step S13). According to this, the CPU 52a sets a limiter current value of a current limiter circuit (step S14).

Conversely, when judged in the step S12 that the sum exceeds the maximum rating, it is further judged whether or not the reader unit 1 has a low power consumption operation mode in which the sum does not exceeds the maximum rating (step S15). When the reader unit 1 has the low power consumption operation mode, the reader unit 1 is set to be in the low power consumption operation mode (step S16).

Then the CPU 40a of the reader unit 1 again transfers the information concerning the current consumption in the low power consumption operation mode to the printer unit 5 (step S17). Like the step S14, the CPU 52a of the LVT 52 sets the limiter current value of the current limiter circuit on the basis of the received current consumption information (step S18).

Conversely, when judged in the step S15 that the reader unit 1 does not have the low power consumption operation mode in which the sum does not exceeds the maximum rating, a display section 51a of FIG. 5 displays that a connectable combination of the reader unit 1 and the printer unit 5 at that time is impossible (step S19).

As above, in the present embodiment, when the plural reader units of different current consumption are connected to the printer unit, the limiter current value of the power supply is set according to the rating current consumption of the reader unit. For example, when the reader unit of the low current consumption is connected to the printer unit, the limiter current value is set to be low. Thus, when the current supplied from the power supply exceeds the rating current of the reader unit, it is possible to quickly and safely shut down a power supply output.

(Third Embodiment)

Next, an image processing apparatus according to the third embodiment of the present invention will be explained.

Since also the image processing apparatus of the present embodiment is different from the image processing apparatus of the first embodiment only in a method of control processing, the hardware same as that in the image processing apparatus of the first embodiment is used, whereby the explanation of the hardware will be omitted in the present embodiment.

Figure 11:
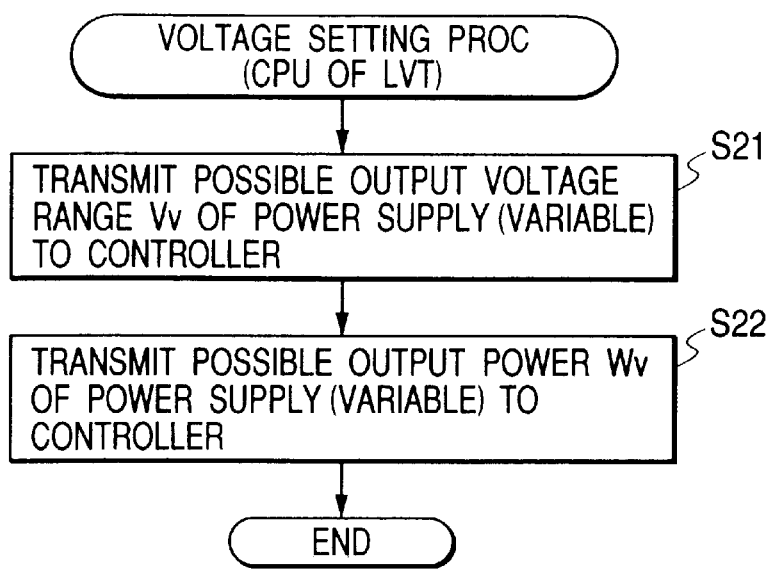
FIG. 11 is a flow chart showing a procedure of voltage setting processing to be performed by an image processing apparatus (especially a CPU of an LVT) according to the third embodiment of the present invention.
Figure 12:
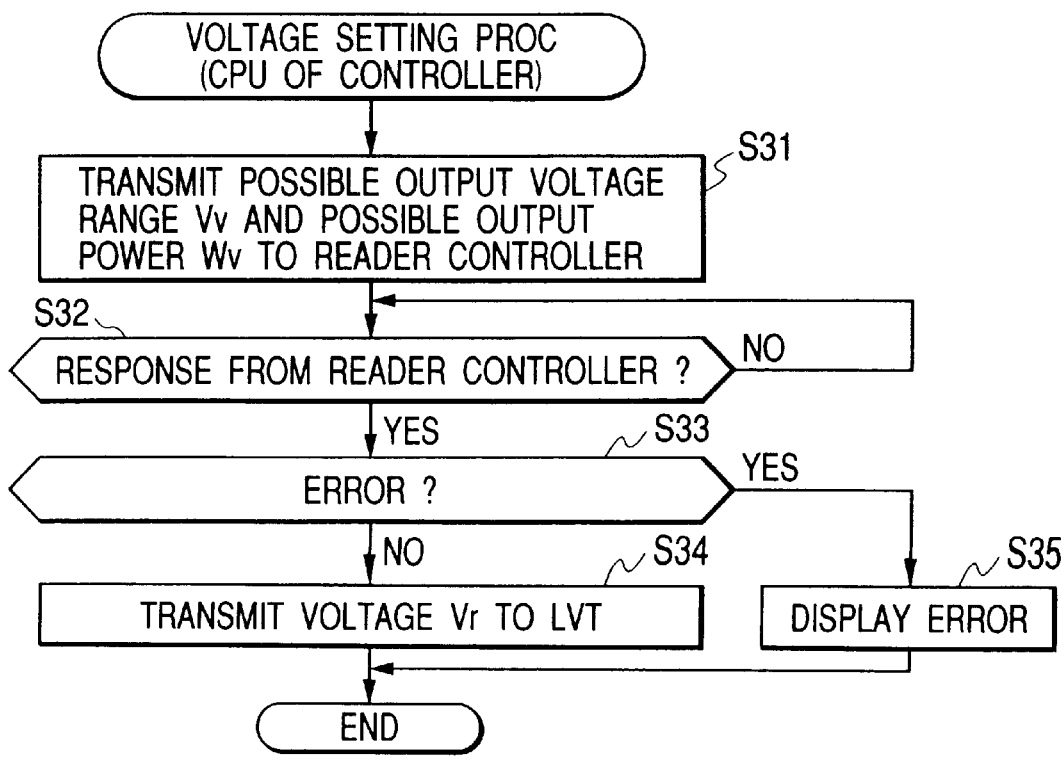
FIG. 12 is a flow chart showing a procedure of voltage setting processing to be performed by the image processing apparatus (especially a CPU of a controller) according to the third embodiment of the present invention.
Figure 13:
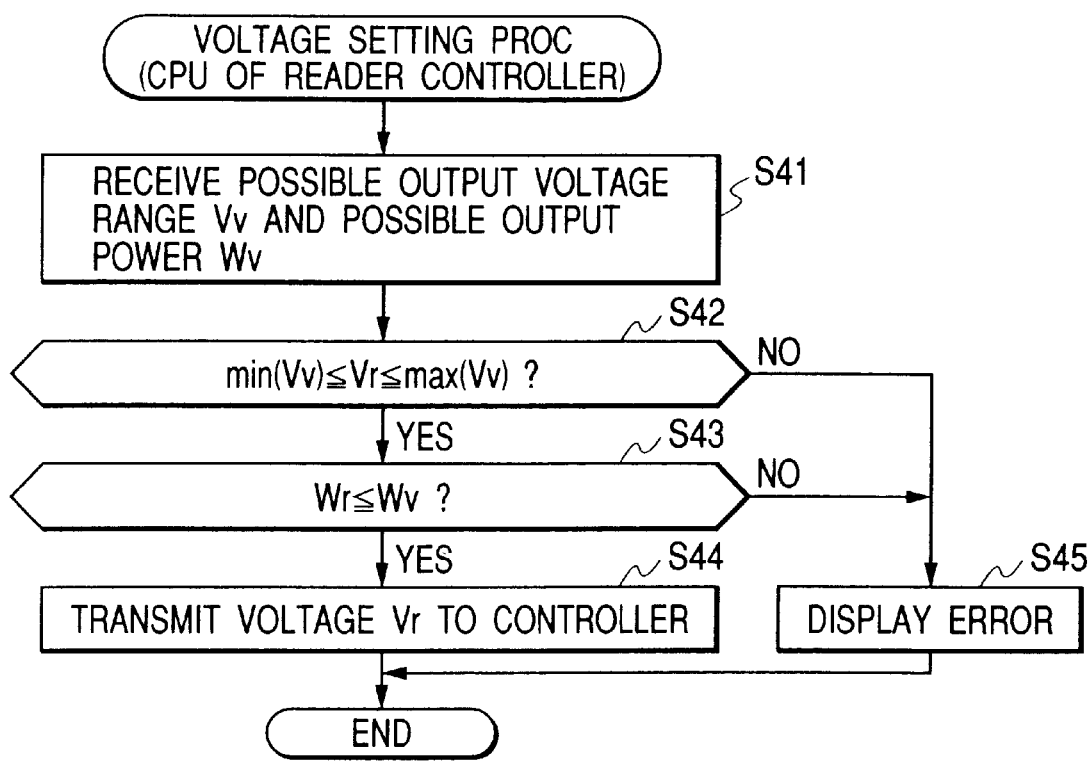
FIG. 13 is a flow chart showing a procedure of voltage setting processing to be performed by the image processing apparatus (especially a CPU of a reader controller) according to the third embodiment of the present invention.

FIGS. 11, 12 and 13 are flow charts showing procedures of voltage setting processing to be performed by the image processing apparatus according to the present embodiment. The processing of FIG. 11 is performed by a CPU 52d of an LVT 52 of FIG. 8, the processing of FIG. 12 is performed by a CPU 50a of a controller 50 of FIG. 5, and the processing of FIG. 13 is performed by a CPU 40a of a reader controller 40 of FIG. 3.

In FIG. 11, a voltage range Vv in which a power supply (variable) CNV4 of the LVT 52 can perform an output is transferred to the controller 50 (step S21). For example, the voltage range Vv is given by a range of 18V to 40V.

Next, power Wv which can be output by the power supply (variable) CNV4 of the LVT 52 is transferred to the controller 50 (step S22).

It should be noted that the voltage range Vv and the power Wv are fixed values determined by design of the LVT 52.

In FIG. 12, the data Vv and Wv received from the LVT 52 are transferred to the reader controller 40 (step S31).

Next, a response from the reader controller 40 is waited (step S32). When the response from the reader controller 40 is received in the step S32, the flow advances to a step S33.

In the step S33, it is judged whether or not the response from the reader controller 40 is error. When the response is error, the flow advances to a step S35 to display the error on a display section 51a of FIG. 5. Conversely, when the response is not error, the flow advances to a step S34 to transfer data Vr received from the reader controller 40 to the LVT 52. According to this, the LVT 52 outputs a voltage (not shown) responsive to the data Vr.

In FIG. 13, first, the voltage range Vv in which the power supply (variable) CNV4 of the LVT 52 can perform the output and the power Wv which can be output by the power supply (variable) CNV4 are received from the controller 50 (step S41).

Next, it is judged in a step S42 whether or not the power Vr (transferred by the controller 50) necessary for a reader unit 1 is within the voltage range Vv. When $\min(Vv) \leq Vr \leq \max(Vv)$, the flow advances to a step S43. In the step S43, the power Wr necessary in the reader unit 1 is compared with the power Wv capable of being output by the power supply (variable) CNV4 of the LVT 52.

When $Wr \leq Wv$ in the step S43, the LVT 52 can supply the power necessary for the reader unit 1, whereby the flow advances to a step S44 to transfer the value of the power Vr to the controller 50. According to this, the controller 50 transfers the power Vr to the LVT 52, whereby the LVT 52 outputs this power.

Conversely, when judged in the step S42 that the power Vr is not within the voltage range Vv, or when Wr>in the step S43, the flow advances to a step S45 to display the error on the display section 51a of FIG. 5 because the LVT 52 can not supply the power necessary for the reader unit 1.

Although the error is displayed as above in the present embodiment, the present invention is not limited to this.

Namely, it is possible to display the necessary powers Vr and Wr such that a serviceman can change an LVT unit. Further, it is possible to previously store data of changeable LVT units in the controller 50 and display type names of the appropriate LVT units among these changeable LVT units.

As above, in the present embodiment, the voltage range Vv in which the power supply CNV4 can perform the output is notified to the reader unit 1, and the reader unit 1 determines its operation state on the basis of the notified voltage range Vv. Thus, degree of freedom for a combination of the reader unit and a printer unit is increased, whereby it is possible to provide the image processing apparatus having an enriched products lineup to a user.

Further, in the present embodiment, also the power Wv capable of being output by the power supply CNV4 is notified to the reader unit 1, and the reader unit 1 determines its operation state also in consideration of the notified power Wv. Thus, it is possible to more accurately select the reader unit capable of being combined with the printer unit having the power supply CNV4.

(Fourth Embodiment)

Next, an image processing apparatus according to the fourth embodiment of the present invention will be explained.

Since also the image processing apparatus of the present embodiment is different from the image processing apparatus of the first embodiment only in a method of control processing, the hardware same as that in the image processing apparatus of the first embodiment is used, whereby the explanation of the hardware will be omitted in the present embodiment.

Figure 14:
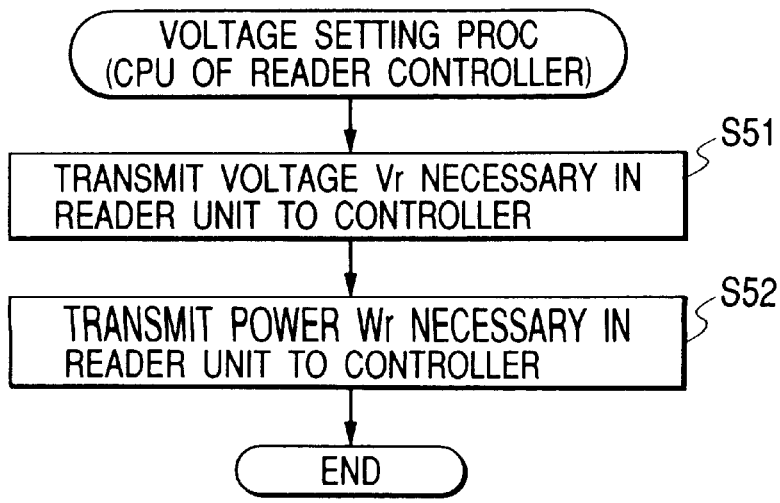
FIG. 14 is a flow chart showing a procedure of voltage setting processing to be performed by an image processing apparatus (especially a CPU of a reader controller) according to the fourth embodiment of the present invention.
Figure 15:
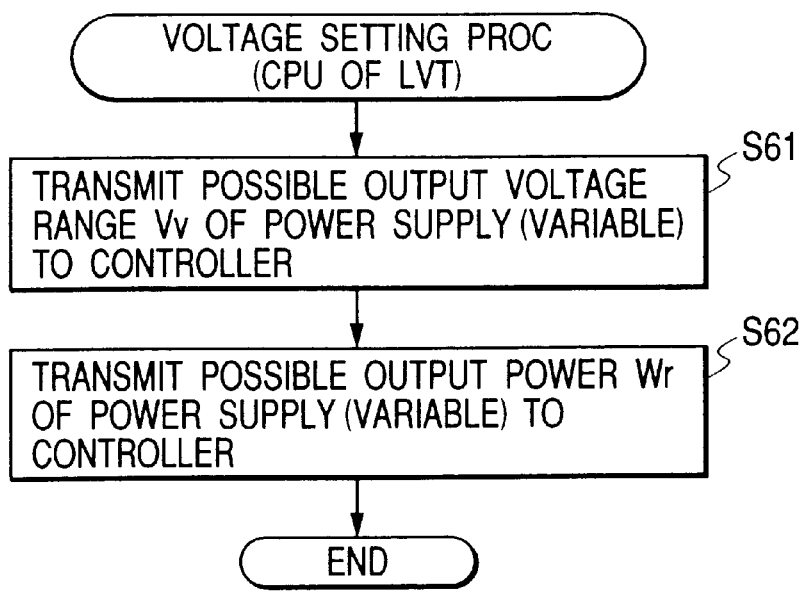
FIG. 15 is a flow chart showing a procedure of voltage setting processing to be performed by the image processing apparatus (especially a CPU of an LVT) according to the fourth embodiment of the present invention.
Figure 16:
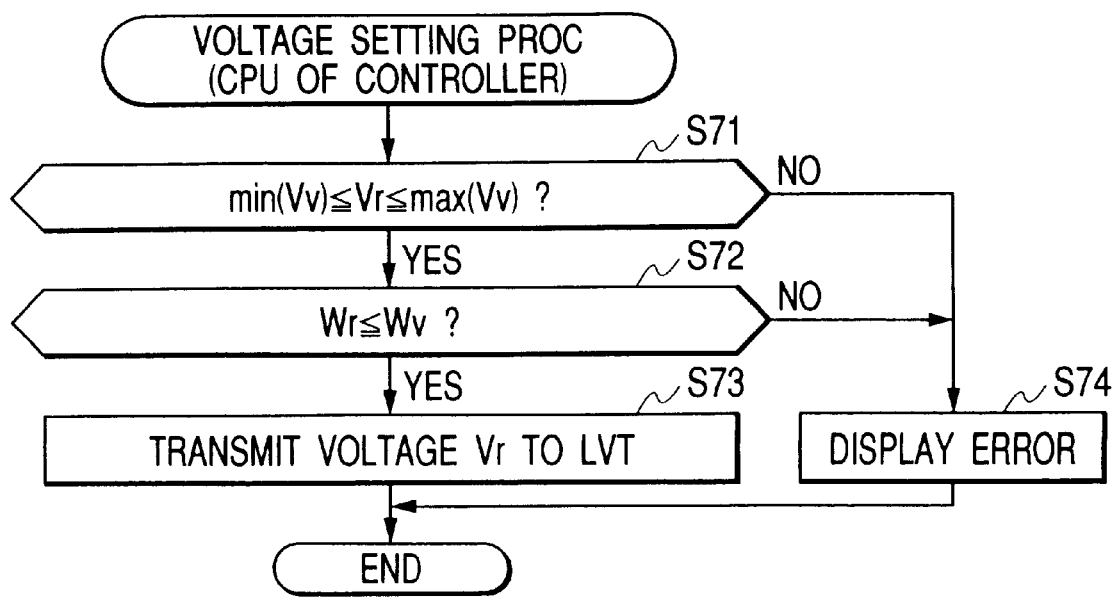
FIG. 16 is a flow chart showing a procedure of voltage setting processing to be performed by the image processing apparatus (especially a CPU of a controller) according to the fourth embodiment of the present invention.

FIGS. 14, 15 and 16 are flow charts showing procedures of voltage setting processing to be performed by the image processing apparatus according to the present embodiment. The processing of FIG. 14 is performed by a CPU 40a of a reader controller 40 of FIG. 3, the processing of FIG. 15 is performed by a CPU 52a of an LVT 52 of FIG. 8, and the processing of FIG. 16 is performed by a CPU 50a of a controller 50 of FIG. 5.

In FIG. 14, a voltage Vr necessary in a reader unit 1 is transferred to the controller 50 (step S51). It should be noted that the voltage Vr is a fixed value determined by design of the reader unit 1.

Next, power Wr necessary in the reader unit 1 is transferred to the controller 50 (step S52). It should be noted that also the power Wr is a fixed value determined by design of the reader unit 1.

In FIG. 15, a voltage range Vv in which a power supply (variable) CNV4 of the LVT 52 can perform an output is transferred to the controller 50 (step S61). For example, the voltage range Vv is given by a range of 18V to 40V.

Next, power Wv which can be output by the power supply (variable) CNV4 of the LVT 52 is transferred to the controller 50 (step S62).

It should be noted that the voltage range Vv and the power Wv are fixed values determined by design of the LVT 52.

In FIG. 16, first, the voltage range Vv in which the power supply (variable) CNV4 of the LVT 52 can perform the output is compared with a power Vr necessary in the reader unit 1 (step S71). When $\min(Vv) \leq Vr \leq \max(Vv)$, the flow advances to a step S72 to compare the power Wr necessary in the reader unit 1 with the power Wv capable of being output by the power supply (variable) CNV4 of the LVT 52.

When $Wr \leq Wv$ in the step S72, the LVT 52 can supply the power necessary for the reader unit 1, whereby the flow advances to a step S73 to transfer the value of the power Vr to the LVT 52. According to this, the LVT 52 outputs this power (voltage).

Conversely, when judged in the step S71 that the power Vr is not within the voltage range Vv, or when Wr>Wv in the step S72, the flow advances to a step S74 to display the error on a display section 51a of FIG. 5 because the LVT 52 can not supply the power necessary for the reader unit 1.

Although the error is displayed in the present embodiment, the present invention is not limited to this. Namely, it is possible to display the necessary powers Vr and Wr such that a serviceman can change an LVT unit. Further, it is possible to previously store data of changeable LVT units in the controller 50 and display type names of the appropriate LVT units among these changeable LVT units.

As above, in the present embodiment, the voltage Vr necessary in the reader unit 1 is notified to the printer unit 5, and the printer unit 5 supplies the notified voltage Vr from the internally provided power supply CNV4 to the reader unit 1. Thus, degree of freedom for a combination of the reader unit and a printer unit is increased, whereby it is possible to provide the image processing apparatus having an enriched products lineup to a user.

(Fifth Embodiment)

Figure 17:
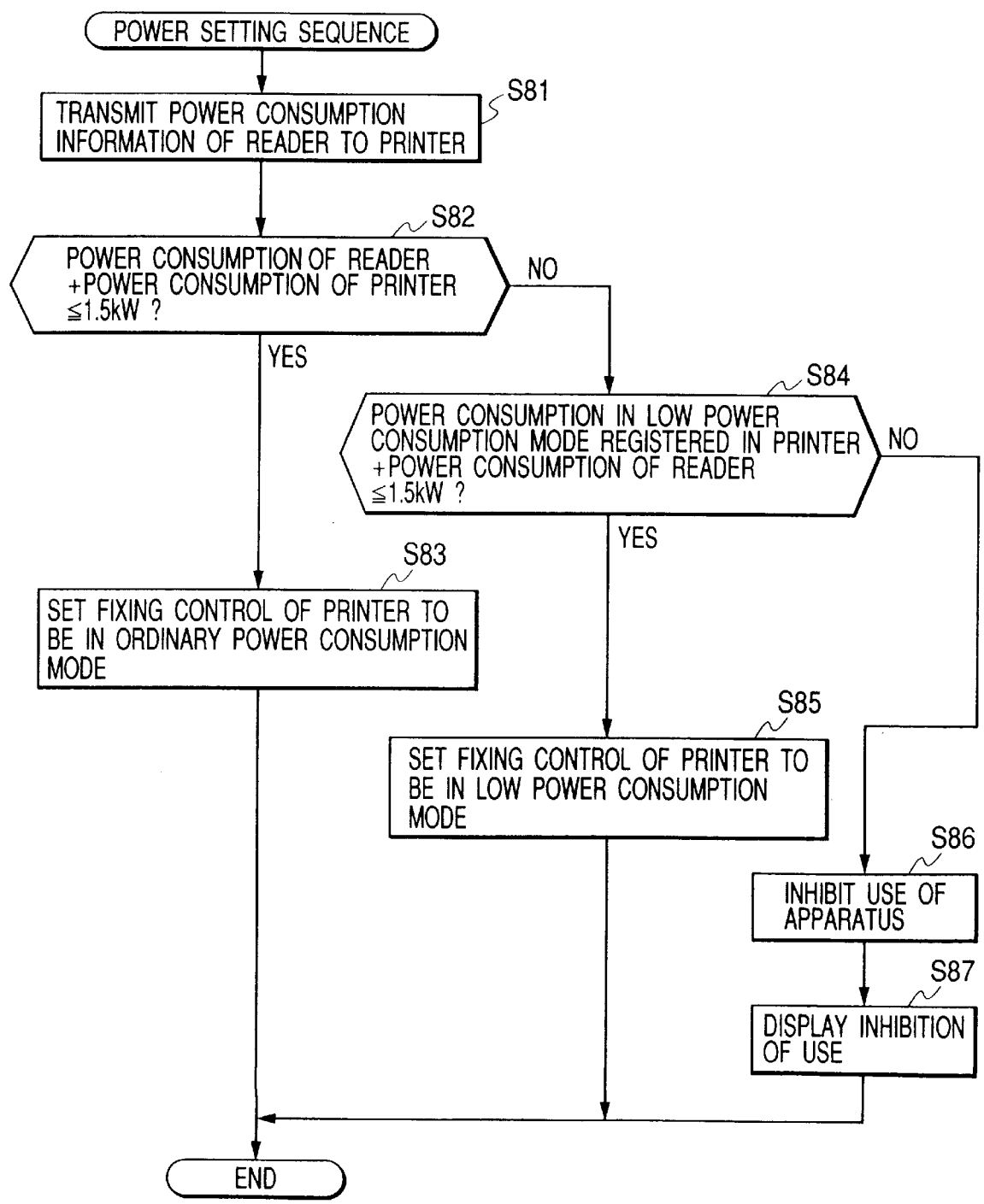
FIG. 17 is a flow chart showing an operation of an image processing apparatus according to the fifth embodiment of the present invention.

FIG. 17 is a flow chart showing a power setting sequence according to the fifth embodiment of the present invention.

After the power supply is turned on, information concerning power consumption of a reader unit 1 is read from a not-shown ROM disposed on the periphery of a CPU 40a, and the read information is transferred to the printer unit 5 (step S81). Next, information concerning power consumption of a printer unit 5 is read from a ROM 50b on the periphery of a CPU 50a, and it is judged whether or not the sum of the power consumption of the printer unit 5 and the power consumption of the reader unit 1 is equal to or smaller than a predetermined value (here 1.5 kW) (step S82). When the sum is equal to or smaller than 1.5 kW, fixing control of the printer unit 5 is set to be in an ordinary power consumption mode (step S83). Conversely, when the sum exceeds 1.5 kW, it is further judged whether or not the sum of power consumption corresponding to plural low power consumption modes prepared in the printer unit 5 and the power consumption of the reader unit 1 is equal to or smaller than 1.5 kW (step S84). When there is a combination equal to or smaller than 1.5 kW, the power consumption mode of the printer unit 5 is set to be the highest-performance low power consumption mode thereamong (step S85). Conversely, when there is no combination equal to or smaller than 1.5 kW, use of the image processing apparatus structured by such the combination is inhibited (step S86). Further, a display section 51a displays that the use of the apparatus is inhibited and the combination of the reader unit 1 and the printer unit 5 at that time is impossible (step S87).

(Sixth Embodiment)

Figure 18:
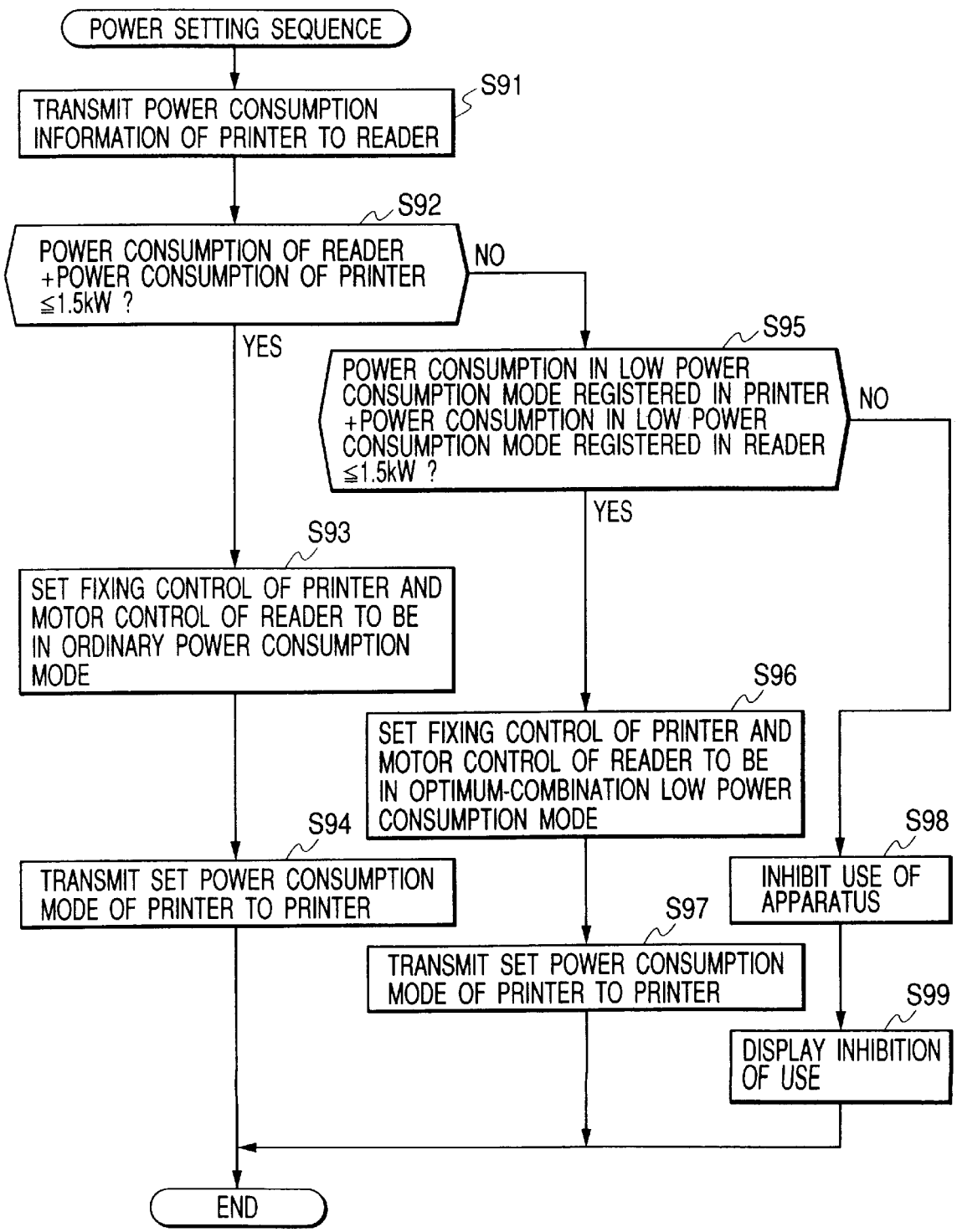
FIG. 18 is a flow chart showing a processing procedure of a power setting sequence according to the sixth embodiment of the present invention.

Next, a processing procedure of a power setting sequence according to the sixth embodiment of the present invention will be explained with reference to FIG. 18.

First, after the power supply is turned on, total power consumption of a printer unit 5 and power values of plural low power consumption modes are transferred from a main controller 50 of the printer unit 5 to a reader controller 40 of a reader unit 1 (step S91).

Then it is judged by the reader controller 40 whether or not the sum of the power consumption of the printer unit 5 and the power consumption of the reader unit 1 (including power consumption of an original feed unit 6) is equal to or smaller than a predetermined value (here 1.5 kW) (step S92). When the sum is equal to or smaller than 1.5 kW, the reader controller 40 sets fixing control of the printer unit 5 and motor control of the reader unit 1 to be in an ordinary power consumption mode (step S93). Then a fixing control mode of the printer unit 5 set by the reader controller 40 of the reader unit 1 is transferred to a printer controller 53 through the main controller 50 of the printer unit 5 (step S94).

Conversely, when the sum of the power consumption of the printer unit 5 and the power consumption of the reader unit 1 exceeds 1.5 kW, the reader controller 40 judges whether or not there is a combination by which the sum of power consumption corresponding to plural low power consumption modes set in the printer unit 5 and power consumption corresponding to plural low power consumption modes set in the reader unit 1 is equal to or smaller than 1.5 kW (step S95).

When there is the combination equal to or smaller than 1.5 kW in the step S95, the reader controller 40 sets control modes for the fixing control of the printer unit 5 and the motor control of the reader unit 1, corresponding to the highest-performance low power consumption mode thereamong (step S96). Then the fixing control mode of the printer set by the reader controller 40 of the reader unit 1 is transferred to the printer controller 53 through the main controller 50 of the printer unit 5 (step S97).

Conversely, when there is no combination equal to or smaller than 1.5 kW in the step S95, the reader controller 40 notifies such a fact to the main controller 50 of the printer unit 5, and the main controller 50 inhibits use of the image processing apparatus by such the combination (step S98). Further, a display section 51a of the Ui (operation unit) 51 displays that the use of the apparatus is inhibited and the combination of the reader unit 1 and the printer unit 5 at that time is impossible (step S99).

Hereinafter, examples of "the power consumption corresponding to the plural low power consumption modes set in the printer unit 5" and "the power consumption corresponding to the plural low power consumption modes set in the reader unit 1" described in the step S95, and examples how the operations of these low power consumption modes are different from the operation of the ordinary power consumption mode will be described.

For example, there is a reader unit A of which power consumption in an ordinary operation is 200 W. In an ordinary mode, a motor (not shown) for driving a scanner unit 9 is controlled with voltage 38V, current 2A, and driving speed 4000 rpm (power consumption of the motor is 76 W). Besides this, in a low power consumption mode, the motor is controlled with voltage 38V, current 1A, and driving speed 2000 rpm (power consumption of the motor is 38 W). At this time, the power consumption of the reader unit A is 162 W.

For example, there is a reader unit B of which power consumption in an ordinary operation is 400 W. In an ordinary mode, a motor (not shown) for driving the scanner unit 9 is controlled with voltage 38V, current 3A, and driving speed 6000 rpm (power consumption of the motor is 114 W). Besides this, in a low power consumption mode, the motor is controlled with voltage 38V, current 2A, and driving speed 4000 rpm (power consumption of the motor is 76 W). At this time, the power consumption of the reader unit B is 362 W.

For example, there is a printer unit A of which power consumption in an ordinary operation is 1200 W. In an ordinary mode, a fixing heater (600 W) is controlled with 600 W (100% driving). Besides this, in a low power consumption mode, the fixing heater is controlled with 500 W (17% down driving). At this time, the power consumption of the printer unit A is 1100 W.

For example, there is a printer unit B of which power consumption in an ordinary operation is 1300 W. In an ordinary mode, a fixing heater (600 W) is controlled with 600 W (100% driving). Besides this, in a low power consumption mode, the fixing heater is controlled with 500 W (17% down driving). At this time, the power consumption of the printer unit A is 1200 W.

FIGS. 19A and 19B show energized states of the fixing heater in the ordinary and low power consumption modes of the printer unit. In the ordinary mode, as shown in FIG. 19A, an I/O 53*d* for driving the heater constantly outputs an H-level signal. According to the output signal, a driver 53*e* (a triac in this case) energizes the fixing heater (not shown) being a load with a waveform shown in FIG. 19A. In the low power consumption mode, as shown in FIG. 19B, the I/O 53*d* for driving the heater outputs to the driver 53*e* an L-level load signal for one of six-divided periods. Thus the driver 53*e* energizes the fixing heater with a waveform (one of six-divided periods is off) shown in FIG. 19B, such that the power of 83% is consumed.

1. Since following two combinations bring the power consumption equal to or smaller than 1500 W, these two combinations are both operated in the ordinary mode.

the reader unit A+the printer unit A(=1400 W)

the reader unit A+the printer unit B(=1500 W)

2. Since a following combination brings the power consumption exceeding 1500 W, the low power consumption mode is checked.

the reader unit B+the printer unit A(=1600 W)

When the reader unit operates in the ordinary mode (400 W) and the printer unit operates in the low power consumption mode (1100 W), this combination brings the power consumption equal to or smaller than 1500 W. Therefore, this combination of the reader and printer units is operated in the above combination of the ordinary and low power consumption modes.

3. Since a following combination brings the power consumption exceeding 1500 W, the low power consumption mode is checked.

the reader unit B+the printer unit B(=1700 W)

However, even when both the reader and printer units operate in the low power consumption mode, this combination brings the power consumption (1562 W) exceeding 1500 W. Therefore, use of the image processing apparatus is inhibited.

(Seventh Embodiment)

Next, a processing procedure of other power setting sequence according to the seventh embodiment of the present invention will be explained with reference to FIG. 20.

First, after the power supply is turned on, total power consumption of a reader unit 1 and power values of plural low power consumption modes are transferred from a reader controller 40 of the reader unit 1 to a main controller 50 of a printer unit 5 (step S1001).

Then it is judged by the main controller 50 whether or not the sum of the power consumption of the printer unit 5 and the power consumption of the reader unit 1 is equal to or smaller than a predetermined value (here 1.5 kW) (step S1002). When the sum is equal to or smaller than 1.5 kW, the main controller 50 sets fixing control of the printer unit 5 and motor control of the reader unit 1 to be in an ordinary power consumption mode (step S1003). Then a motor control mode of the reader unit 1 set by the main controller 50 is transferred from the main controller 50 of the printer unit 5 to the reader controller 40 of the reader unit 1 (step S1004).

Conversely, when the sum of the power consumption of the printer unit 5 and the power consumption of the reader unit 1 exceeds 1.5 kW, the main controller 50 judges whether or not there is a combination by which the sum of power consumption corresponding to plural low power consumption modes set in the printer unit 5 and power consumption corresponding to plural low power consumption modes set in the reader unit 1 is equal to or smaller than 1.5 kW (step S1005).

When there is the combination equal to or smaller than 1.5 kW in the step S1005, the main controller 50 sets control modes for fixing control of the printer unit 5 and motor control of the reader unit 1, corresponding to the highest-performance power consumption mode thereamong (step S1006). Then the power consumption mode for the reader unit 1 set by the printer unit 5 is transferred from the main controller 50 of the printer unit 5 to the reader controller 40 of the reader unit 1 (step S1007).

Conversely, when there is no combination equal to or smaller than 1.5 kW in the step S1005, the main controller 50 inhibits use of the image processing apparatus based on the above combination (step S1008). Further, a display section displays that the use of the apparatus is inhibited and the combination of the reader unit 1 and the printer unit 5 at that time is impossible (step S1009).

The control methods in the power consumption modes of the reader unit 1 and the printer unit 5 are not limited to those described in the above first to fifth embodiments. Namely, various modifications can be thought.

It is needless to say that the object of the present invention can be achieved in a case where a storage medium storing the program codes of software for realizing the functions of the above embodiments is supplied to a system or an apparatus and then a computer (or CPU (CPU's 40*a*, 50*a*, 52*a* and 53*a* in the above embodiments) or MPU) in the system or the apparatus reads and executes the program codes stored in the storage medium.

In this case, the program codes themselves read from the storage medium realize the new functions of the present invention, and the storage medium storing such the program codes constitutes the present invention.

As the storage medium used to supply the program codes, e.g., a floppy disk, a hard disk, an optical disk, a magnetooptical disk, a CD-ROM, a CD-R, a magnetic tape, a non-volatile memory card, a ROM, or the like can be used. The program codes may be supplied from a server computer through a communication network.

Further, it is needless to say that the present invention also includes not only the case where the functions of the above embodiments are realized by executing the program codes read by the computer, but also a case where an OS or the like functioning on the computer executes all or part of the processing according to instructions of the program codes, thereby realizing the functions of the above embodiments.

Further, it is needless to say that the present invention further includes a case where the program codes read from the storage medium are once stored in a memory provided in a function expansion board inserted in the computer or a function expansion unit connected to the computer, and a CPU or the like provided in the function expansion board or the function expansion unit executes all or part of the processing according to instructions of such program codes, thereby realizing the functions of the embodiments.

As explained above, according to the above embodiments of the present invention, the image processing apparatus which is structured by combining the image reading apparatus and the image formation apparatus with each other, in which the user can freely combine the image reading apparatus and the image formation apparatus with each other without considering the sum of the power consumption of the image reading apparatus and the power consumption of the image formation apparatus, the control method for the image processing apparatus, and the storage medium can be provided.

Although the present invention has been explained by use of the preferred embodiments, the present invention is not limited to these embodiments. Namely, it is obvious that various modifications and changes are possible in the present invention without departing from the spirit and scope of the appended claims.

What is claimed is:

1. An image formation apparatus which supplies power to a connected image reading apparatus, comprising:
   reception means for receiving information concerning power consumption of said image reading apparatus, from said image reading apparatus; and
   setting means for setting said image reading apparatus to be in a low power consumption mode, according to power consumption of said image formation apparatus and the power consumption of said image reading apparatus.

2. An apparatus according to claim 1, wherein said reception means receives the information concerning power consumption of each of plural power modes.

3. An apparatus according to claim 2, wherein said setting means selects and sets any of the plural power modes.

4. An apparatus according to claim 3, wherein said setting means selects and sets to be the highest performance low power consumption mode among the plural power modes.

5. An apparatus according to claim 1, wherein the received information is stored in a memory of said image reading apparatus.

6. An image formation apparatus which supplies power to a connected image reading apparatus, comprising:
   reception means for receiving information concerning power consumption of said image reading apparatus, from said image reading apparatus; and
   means for setting said image formation apparatus to be in a low power consumption mode, according to the power consumption of said image reading apparatus and power consumption of said image formation apparatus.

7. An apparatus according to claim 6, further comprising control means for changing a control condition of a heater in accordance with whether said low power consumption mode is set.

8. An apparatus according to claim 6, wherein the received information is stored in a memory of said image reading apparatus.

9. An image reading apparatus to which power is supplied from a connected image formation apparatus, comprising:
   reception means for receiving information concerning power consumption of said image formation apparatus, from said image formation apparatus; and
   means for setting said image reading apparatus to be in a low power consumption mode, according to the power consumption of said image formation apparatus and power consumption of said image reading apparatus.

10. An apparatus according to claim 9, further comprising control means for changing a control condition of a motor in accordance with whether said low power consumption mode is set.

11. An apparatus according to claim 9, wherein the received information is stored in a memory of said image reading apparatus.

12. An image reading apparatus to which power is supplied from a connected image formation apparatus, comprising:
   reception means for receiving information concerning power consumption of said image formation apparatus, from said image formation apparatus; and
   setting means for setting said image formation apparatus to be in a low power consumption mode, according to the power consumption of said image formation apparatus and power consumption of said image reading apparatus.

13. An apparatus according to claim 12, wherein said reception means receives the information concerning power consumption of each of plural power modes.

14. An apparatus according to claim 13, wherein said setting means selects and sets any of the plural power modes.

15. An apparatus according to claim 14, wherein said setting means selects and sets to be the highest performance low power consumption mode among the plural power modes.

16. An apparatus according to claim 12, wherein the received information is stored in a memory of said image reading apparatus.

17. An image formation apparatus which supplies power to a connected image reading apparatus, comprising:
   reception means for receiving information concerning power consumption of said image reading apparatus, from a controller of said image reading apparatus; and
   limitation means for limiting a current supplied to said image reading apparatus, according to the power consumption of said image reading apparatus and power consumption of said image formation apparatus.

18. An apparatus according to claim 17, wherein the controller controls a reading operation.

19. An apparatus according to claim 17, wherein the received information is stored in a memory of said image reading apparatus.

20. An image reading apparatus to which power is supplied from a connected image formation apparatus, comprising:
   reception means for receiving information concerning a voltage capable of being supplied by said image formation apparatus, from a controller of said image formation apparatus;
   judgment means for judging whether or not said image reading apparatus itself can be driven by the voltage capable of being supplied in accordance with the received information; and
   means for performing error processing in a case where said image reading apparatus itself can not be driven by the voltage.

21. An apparatus according to claim 20, wherein said image formation apparatus include a changeable power unit.

22. An apparatus according to claim 20, wherein said image formation apparatus include a power supply unit and said judgment means judge in accordance with a voltage capable of being output by said power supply unit and a voltage necessary for said image reading apparatus.

23. An apparatus according to claim 20, wherein the error processing includes displaying by a display unit, indicating that the combination of said image formation apparatus and said image reading apparatus is inappropriate.

24. An apparatus according to claim 23, wherein the displaying indicating that the combination of said image formation apparatus and said image reading apparatus is inappropriate includes a type name of a changeable power supply unit.

25. An apparatus according to claim 23, wherein the displaying indicating that the combination of said image formation apparatus and said image reading apparatus is inappropriate includes displaying of necessary power or voltage.

26. An apparatus according to claim 20, wherein the controller controls a printing operation.

27. An apparatus according to claim 20, wherein the received information is stored in a memory of said image formation apparatus.

28. An image reading apparatus to which power is supplied from a connected image formation apparatus, comprising:
    reception means for receiving information concerning the power capable of being supplied by said image formation apparatus, from a controller of said image formation apparatus;
    judgment means for judging whether or not said image reading apparatus itself can be driven by the power capable of being supplied in accordance with the received information; and
    means for performing error processing in a case where said image reading apparatus itself can not be driven by the power.

29. An apparatus according to claim 28, wherein said image formation apparatus include a power supply unit and said judgment means judge in accordance with a voltage capable of being output by said power supply unit and a voltage necessary for said image reading apparatus.

30. An apparatus according to claim 28, wherein the error processing includes displaying by a display unit indicating that the combination of said image formation apparatus and said image reading apparatus is inappropriate.

31. An apparatus according to claim 28, wherein the controller controls a printing operation.

32. An apparatus according to claim 28, wherein the received information is stored in a memory of said image formation apparatus.

33. An apparatus according to claim 28, wherein said image formation apparatus include a changeable power unit.

34. An image formation apparatus which supplies power to a connected image reading apparatus, comprising:
    reception means for receiving information concerning a necessary voltage of said image reading apparatus, from a controller of said image reading apparatus;
    judgment means for judging whether or not the necessary voltage of said image reading apparatus can be supplied to said image reading apparatus in accordance with the received information; and
    means for performing error processing in a case where the necessary voltage of said image reading apparatus can not be supplied to said image reading apparatus.

35. An apparatus according to claim 34, wherein said image formation apparatus include a changeable power supply unit.

36. An apparatus according to claim 34, wherein said image formation apparatus include a power supply unit and said judgment means judge in accordance with a power capable of being output by said power supply unit and a power necessary for said image reading apparatus.

37. An apparatus according to claim 34, wherein the error processing includes displaying by a display unit indicating that the combination of said image formation apparatus and said image reading apparatus is inappropriate.

38. An apparatus according to claim 37, wherein the displaying indicating that the combination of said image formation apparatus and said image reading apparatus is inappropriate includes a type name of a changeable power supply unit.

39. An apparatus according to claim 37, wherein the displaying indicating that the combination of said image formation apparatus and said image reading apparatus is inappropriate includes displaying of necessary power or voltage.

40. An apparatus according to claim 34, wherein the controller controls a reading operation.

41. An apparatus according to claim 34, wherein the received information is stored in a memory of said image reading apparatus.

42. An image formation apparatus which supplies power to a connected image reading apparatus, comprising:
    reception means for receiving information concerning the necessary power of said image leading apparatus, from a controller of said image reading apparatus;
    judgment means for judging whether or not the necessary power of said image reading apparatus can be supplied to said image reading apparatus in accordance with the received information; and
    means for performing error processing in a case where the necessary power of said image reading apparatus can not be supplied to said image reading apparatus.

43. An apparatus according to claim 42, wherein said image formation apparatus include a power supply unit and said judgment means judge in accordance with a power capable of being output by said power supply unit and a power necessary for said image reading apparatus.

44. An apparatus according to claim 42, wherein the error processing includes displaying by a display unit indicating that the combination of said image formation apparatus and said image reading apparatus is inappropriate.

45. A method according to claim 42, wherein the controller controls a reading operation.

46. An apparatus according to claim 42, wherein the received information is stored in a memory of said image reading apparatus.

47. An apparatus according to claim 42, wherein said image formation apparatus include a changeable power supply unit.

48. An image processing apparatus comprising:
    image reading means for reading an image;
    image formation means for forming the image read by said image reading means;
    supply means for supplying power to said image formation means and said image reading means; and
    setting means for setting said image reading means to be in a low power consumption mode according to power consumption of said image reading means and power consumption of said image formation means.

49. An apparatus according to claim 48, further comprising control means for changing a control condition of a motor in accordance with whether said low power consumption mode is set.

50. An image processing apparatus, comprising:
    image reading means for reading an image;
    image formation means for forming the image read by said image reading means;
    supply means for supplying power to said image formation means and said image reading means; and setting means for setting said image formation means to be in a low power consumption mode according to power consumption of said image reading means and power consumption of said image formation means.

51. An apparatus according to claim 50, further comprising control means for changing a control condition of a heater in accordance with whether said low power consumption mode is set.

52. A control method for an image formation apparatus which supplies power to a connected image reading apparatus, comprising:
- a reception step of receiving information concerning power consumption of the image reading apparatus, from the image reading apparatus; and
- a setting step of setting the image reading apparatus to be in a low power consumption mode, according to power consumption of the image formation apparatus and the power consumption of the image reading apparatus.

53. A method according to claim 52, wherein the received information is stored in a memory of said image reading apparatus.

54. A control method for an image formation apparatus which supplies power to a connected image reading apparatus, comprising:
- a reception step of receiving information concerning power consumption of the image reading apparatus, from the image reading apparatus; and
- a step of setting the image formation apparatus to be in a low power consumption mode, according to the power consumption of the image reading apparatus and power consumption of the image formation apparatus.

55. A method according to claim 54, wherein the received information is stored in a memory of said image reading apparatus.

56. A control method for an image reading apparatus to which power is supplied from a connected image formation apparatus, comprising:
- a reception step of receiving information concerning power consumption of the image formation apparatus, from the image formation apparatus; and
- a step of setting the image reading apparatus to be in a low power consumption mode, according to the power consumption of the image formation apparatus and power consumption of the image reading apparatus.

57. A method according to claim 56, wherein the received information is stored in a memory of said image reading apparatus.

58. A control method for an image reading apparatus to which power is supplied from a connected image formation apparatus, comprising:
- a reception step of receiving information concerning power consumption of the image formation apparatus, from the image formation apparatus; and
- a setting step of setting the image formation apparatus to be in a low power consumption mode, according to the power consumption of the image formation apparatus and power consumption of the image reading apparatus.

59. A method according to claim 58, wherein the received information is stored in a memory of said image reading apparatus.

60. A control method for an image formation apparatus which supplies power to a connected image reading apparatus, comprising:
- a reception step of receiving information concerning power consumption of the image reading apparatus, from a controller of the image reading apparatus; and
- a limitation step of limiting a current supplied to the image reading apparatus, according to the power consumption of the image reading apparatus and power consumption of the image formation apparatus.

61. A method according to claim 60, wherein the controller controls a reading operation.

62. A method according to claim 60, wherein the received information is stored in a memory of said image reading apparatus.

63. A control method for an image reading apparatus to which power is supplied from a connected image formation apparatus, comprising:
- a reception step of receiving information concerning a voltage capable of being supplied by the image formation apparatus, from a controller of the image formation apparatus;
- a judgment step of judging whether or not the image reading apparatus itself can be driven by the voltage capable of being supplied in accordance with the received information; and
- a step of performing error processing in a case where the image reading apparatus itself can not be driven by the voltage.

64. A method according to claim 63, wherein the controller controls a printing operation.

65. A method according to claim 63, wherein the received information is stored in a memory of said image formation apparatus.

66. A control method for an image reading apparatus to which power is supplied from a connected image formation apparatus, comprising:
- a reception step of receiving information concerning the power capable of being supplied by the image formation apparatus, from a controller of the image formation apparatus;
- a judgment step of judging whether or not the image reading apparatus itself can be driven by the power capable of being supplied in accordance with the received information; and
- a step of performing error processing in a case where the image reading apparatus itself can not be driven by the power.

67. A method according to claim 66, wherein the controller controls a printing operation.

68. A method according to claim 66, wherein the received information is stored in a memory of said image formation apparatus.

69. A control method for an image formation apparatus which supplies power to a connected image reading apparatus, comprising:
- a reception step of receiving information concerning a necessary voltage of the image reading apparatus, from a controller of the image reading apparatus;
- a judgment step of judging whether or not the necessary voltage of the image reading apparatus can be supplied to the image reading apparatus in accordance with the received information; and
- a step of performing error processing in a case where the necessary voltage of the image reading apparatus can not be supplied to the image reading apparatus.

70. A method according to claim 69, wherein the controller controls a reading operation.

71. A method according to claim 69, wherein the received information is stored in a memory of said image reading apparatus.

72. A control method for an image formation apparatus which supplies power to a connected image reading apparatus, comprising:

a reception step of receiving information concerning the necessary power of the image reading apparatus, from a controller of the image reading apparatus;

a judgment step of judging whether or not the necessary power of the image reading apparatus can be supplied to the image reading apparatus in accordance with the received information; and a step of performing error processing in a case where the necessary power of the image reading apparatus can not be supplied to the image reading apparatus.

73. A method according to claim 72, wherein the controller controls a reading operation.

74. A method according to claim 72, wherein the received information is stored in a memory of said image reading apparatus.

75. A control method for an image processing apparatus which comprises an image reading unit for reading an image, an image formation unit for forming the image read by the image reading unit, and a supply unit for supplying power to the image formation unit and the image reading unit, said method comprising:

a setting step of setting the image reading unit to be in a low power consumption mode according to power consumption of the image reading unit and power consumption of the image formation unit.

76. A method according to claim 75, further comprising a control step of changing a control condition of a motor in accordance with whether the low power consumption mode is set.

77. A method for an image processing apparatus which comprises an image reading unit for reading an image, an image formation unit for forming the image read by the image reading unit, and a supply unit for supplying power to the image formation unit and the image reading unit, said method comprising:

a setting step of setting the image formation unit to be in a low power consumption mode according to power consumption of the image reading unit and power consumption of the image formation unit.

78. A method according to claim 77, further comprising a control step of changing a control condition of a heater in accordance with whether the low power consumption mode is set.

79. A computer-readable storage medium which stores a computer program to control an image processing apparatus which comprises an image reading unit for reading an image, an image formation unit for forming the image read by the image reading unit, and a supply unit for supplying power to the image formation unit and the image reading unit, said computer program including:

a setting step of setting said image processing apparatus to be in a lower power consumption mode according to power consumption of the image reading unit and power consumption of the image formation unit.

80. An image reading apparatus to which power is supplied from a connected image formation apparatus, comprising:

reception means for receiving information concerning power consumption of said image formation apparatus, from a controller of said image formation apparatus; and limitation means for limiting a current supplied to said image reading apparatus, according to the power consumption of said image reading apparatus and power consumption of said image formation apparatus.

81. An apparatus according to claim 43, wherein the controller controls a printing operation.

82. An apparatus according to claim 80, wherein the received information is stored in a memory of said image formation apparatus.

83. A control method for an image reading apparatus to which power is supplied from a connected image formation apparatus, comprising:

a reception step of receiving information concerning power consumption of said image formation apparatus, from a controller of said image formation apparatus; and a limitation step of limiting a current supplied to said image reading apparatus, according to the power consumption of said image reading apparatus and power consumption of said image formation apparatus.

84. A method according to claim 83, wherein the controller controls a printing operation.

85. A method according to claim 83, wherein the controller controls a reading operation.

86. A method according to claim 83, wherein the received information is stored in a memory of said image formation apparatus.

* * * * *

UNITED STATES PATENT AND TRADEMARK OFFICE
CERTIFICATE OF CORRECTION

PATENT NO. : 6,408,149 B1
DATED : June 18, 2002
INVENTOR(S) : Masayoshi Taira et al.

It is certified that error appears in the above-identified patent and that said Letters Patent is hereby corrected as shown below:

Column 1,
Lines 27, 37 and 52, "the" should read -- a --.

Column 4,
Lines 5, 28, 33 and 67, "referred" should read -- referred to --.

Column 5,
Line 31, "the" should be deleted.

Column 9,
Line 29, "the" should read -- an --.

Column 10,
Lines 43 and 56, "exceeds" should read -- exceed --.

Column 11,
Line 36, "error." should read -- an error. --;
Line 37, "error," (first occurrence) should read -- an error, --; and
Line 39, "error," should read -- an error, --.

Column 13,
Line 47, "the" should be deleted.

Column 14,
Line 28, "the" should be deleted.

Column 15,
Line 19, "following" should read -- the following --;
Lines 25 and 38, "a" should read -- the --; and
Line 50, "other" should read -- another --.

Column 16,
Line 42, "the" (second occurrence) should be deleted.

Column 18,
Lines 58 and 60, "include" should read -- includes --; and
Line 61, "judge" should read -- judges --.

UNITED STATES PATENT AND TRADEMARK OFFICE
CERTIFICATE OF CORRECTION

PATENT NO.    : 6,408,149 B1
DATED         : June 18, 2002
INVENTOR(S)   : Masayoshi Taira et al.

It is certified that error appears in the above-identified patent and that said Letters Patent is hereby corrected as shown below:

<u>Column 19,</u>
Lines 30, 44, 59 and 62, "include" should read -- includes --;
Lines 31 and 63, "judge" should read -- judges --;
Line 33, "voltage" should read -- power --; and
Line 65, "power" should read -- voltage --.

<u>Column 20,</u>
Line 21, "leading" should read -- reading --;
Lines 31 and 45, "include" should read -- includes --; and
Line 32, "judge" should read -- judges --.

Signed and Sealed this

Twenty-sixth Day of November, 2002

*Attest:*

JAMES E. ROGAN
*Attesting Officer*        *Director of the United States Patent and Trademark Office*